(12) United States Patent
Ebrahim et al.

(10) Patent No.: US 7,045,913 B2
(45) Date of Patent: May 16, 2006

(54) MICROTURBINE ENGINE SYSTEM

(75) Inventors: Mohammed Ebrahim, Portsmouth, NH (US); German Lakov, North Andover, MA (US); Sunit Oliver, Newmarket, NH (US)

(73) Assignee: Ingersoll Rand Energy Systems, Portsmouth, NH (US)

( * ) Notice: Subject to any disclaimer, the term of this patent is extended or adjusted under 35 U.S.C. 154(b) by 0 days.

(21) Appl. No.: 11/257,555

(22) Filed: Oct. 25, 2005

(65) Prior Publication Data

US 2006/0066113 A1      Mar. 30, 2006

Related U.S. Application Data

(63) Continuation of application No. 10/464,380, filed on Jun. 18, 2003.

(60) Provisional application No. 60/389,765, filed on Jun. 18, 2002.

(51) Int. Cl.
*H02K 9/00* (2006.01)

(52) U.S. Cl. ...................................... 290/52

(58) Field of Classification Search ................ 290/52
See application file for complete search history.

(56) References Cited

U.S. PATENT DOCUMENTS

| | | | | |
|---|---|---|---|---|
| 3,174,284 A | * | 3/1965 | McCarthy | 60/791 |
| 3,520,133 A | * | 7/1970 | Loft et al. | 60/790 |
| 3,531,934 A | * | 10/1970 | Hope-Gill | 60/774 |
| 3,594,586 A | | 7/1971 | Toesca | 307/66 |
| 3,630,022 A | * | 12/1971 | Jubb | 376/391 |
| 3,775,666 A | | 11/1973 | Smith | 322/28 |
| 3,898,439 A | * | 8/1975 | Reed et al. | 700/287 |
| 3,902,073 A | | 8/1975 | Lafuze | 290/46 |
| 4,000,609 A | * | 1/1977 | Chute | 60/804 |
| 4,031,407 A | | 6/1977 | Reed | 307/87 |
| 4,041,699 A | * | 8/1977 | Schelp | 60/39.55 |
| 4,249,088 A | | 2/1981 | Kleb et al. | 307/87 |
| 4,388,585 A | | 6/1983 | Nola | 322/47 |
| 4,405,867 A | | 9/1983 | Moakier et al. | 307/64 |
| 4,473,792 A | | 9/1984 | Nola | 322/47 |
| 4,973,896 A | | 11/1990 | Shiga et al. | 322/28 |

(Continued)

FOREIGN PATENT DOCUMENTS

DE      44 11 327      3/1995

(Continued)

OTHER PUBLICATIONS

Dresser-Rand Products & Services, KG Gas Turbines, http://www.dresser-rand.com/turbo/eq/kgturbine.asp.

(Continued)

*Primary Examiner*—Darren Schuberg
*Assistant Examiner*—Pedro J. Cuevas
(74) *Attorney, Agent, or Firm*—Michael Best & Friedrich LLP

(57) ABSTRACT

A microturbine engine that includes a compressor that is operable to provide a flow of compressed air. The compressed air flows through a recuperator where it is preheated before delivery to a combustor. The preheated compressed air mixes with a fuel and is combusted within the combustor to provide a flow of products of combustion. The flow of products of combustion pass through one or more turbines to drive the compressor and a synchronous generator. The synchronous generator is able to synchronize to a priority load, to the utility grid or to both depending on the mode of operation. A control system monitors various engine parameters as well as load and grid parameters to determine the desired mode of operation.

6 Claims, 20 Drawing Sheets

U.S. PATENT DOCUMENTS

| | | | | |
|---|---|---|---|---|
| 5,083,040 | A * | 1/1992 | Whitford et al. | 290/52 |
| 5,111,377 | A | 5/1992 | Higasa et al. | 363/95 |
| 5,162,964 | A | 11/1992 | Higasa et al. | 361/20 |
| 5,202,633 | A * | 4/1993 | Doty et al. | 324/321 |
| 5,207,050 | A | 5/1993 | Rodgers et al. | 60/804 |
| 5,207,054 | A * | 5/1993 | Rodgers et al. | 60/804 |
| 5,333,994 | A * | 8/1994 | Doty et al. | 415/202 |
| 5,390,068 | A | 2/1995 | Schultz et al. | 361/95 |
| 5,493,485 | A | 2/1996 | Okada | 363/56.01 |
| 5,589,743 | A | 12/1996 | King | 318/139 |
| 5,594,322 | A | 1/1997 | Rozman et al. | 322/10 |
| 5,635,768 | A | 6/1997 | Birch et al. | 290/400 |
| 5,646,458 | A * | 7/1997 | Bowyer et al. | 307/67 |
| 5,686,766 | A | 11/1997 | Tamechika | 307/43 |
| 5,805,394 | A | 9/1998 | Glennon | 361/20 |
| 5,808,449 | A | 9/1998 | Hirayama et al. | 322/20 |
| 5,929,610 | A | 7/1999 | Friedlander et al. | 322/37 |
| 5,932,940 | A * | 8/1999 | Epstein et al. | 310/40 MM |
| 5,995,396 | A * | 11/1999 | Byrne et al. | 363/89 |
| 6,066,898 | A | 5/2000 | Jensen | 290/52 |
| 6,072,302 | A | 6/2000 | Underwood et al. | 322/17 |
| 6,107,693 | A | 8/2000 | Mongia et al. | 290/52 |
| 6,107,784 | A | 8/2000 | Nomiya et al. | 323/205 |
| 6,118,187 | A | 9/2000 | Hepner et al. | 290/408 |
| 6,134,124 | A * | 10/2000 | Jungreis et al. | 363/34 |
| 6,140,803 | A | 10/2000 | Hurley et al. | 322/29 |
| 6,147,414 | A | 11/2000 | McConnell et al. | 290/52 |
| 6,172,889 | B1 | 1/2001 | Eguchi et al. | 74/424.87 |
| 6,198,174 | B1 | 3/2001 | Nims et al. | 290/52 |
| 6,208,120 | B1 | 3/2001 | Gibbs | 322/59 |
| 6,219,623 | B1 | 4/2001 | Wills | 702/60 |
| 6,232,751 | B1 | 5/2001 | Farr et al. | 322/59 |
| 6,239,511 | B1 | 5/2001 | Joho | 307/38 |
| 6,281,595 | B1 | 8/2001 | Sinha et al. | 290/40 A |
| 6,304,006 | B1 | 10/2001 | Jungreis | 307/64 |
| 6,313,544 | B1 | 11/2001 | Mongia et al. | 290/52 |
| 6,316,918 | B1 | 11/2001 | Underwood et al. | 322/20 |
| 6,333,622 | B1 | 12/2001 | Fogerty et al. | 322/90 |
| 6,355,987 | B1 | 3/2002 | Bixel | 290/52 |
| 6,380,719 | B1 | 4/2002 | Underwood et al. | 322/36 |
| 6,411,065 | B1 | 6/2002 | Underwood et al. | 322/20 |
| 6,429,546 | B1 | 8/2002 | Ropp et al. | 307/31 |
| 6,437,535 | B1 | 8/2002 | Sinha | 318/800 |
| 6,545,885 | B1 | 4/2003 | Nishimura et al. | 363/39 |
| 6,820,689 | B1 * | 11/2004 | Sarada | 166/266 |
| 6,865,891 | B1 * | 3/2005 | Walsh et al. | 60/792 |
| 6,879,053 | B1 * | 4/2005 | Welches et al. | 290/6 |
| 6,895,760 | B1 * | 5/2005 | Kesseli | 60/777 |
| 6,960,840 | B1 * | 11/2005 | Willis et al. | 290/52 |
| 6,969,922 | B1 * | 11/2005 | Welches et al. | 290/1 A |
| 6,979,914 | B1 * | 12/2005 | McKelvey et al. | 290/40 C |
| 2001/0056330 | A1 | 12/2001 | Wills | 702/60 |
| 2002/0005643 | A1 | 1/2002 | Gilbreth et al. | 290/52 |
| 2002/0047699 | A1 | 4/2002 | Katoh et al. | 324/76.39 |
| 2002/0048179 | A1 | 4/2002 | Nomiya et al. | 363/50 |
| 2002/0060556 | A1 | 5/2002 | Wall | 322/29 |
| 2002/0190695 | A1 | 12/2002 | Wall et al. | 322/17 |
| 2003/0007369 | A1 | 1/2003 | Gilbreth et al. | 363/35 |
| 2003/0015873 | A1 | 1/2003 | Khalizadeh et al. | 290/7 |
| 2003/0080741 | A1 | 5/2003 | LeRow et al. | 324/320 |
| 2003/0098671 | A1 | 5/2003 | Hochgraf | 322/36 |
| 2004/0002736 | A1 * | 1/2004 | Waltman | 607/5 |

FOREIGN PATENT DOCUMENTS

| | | |
|---|---|---|
| EP | 0 295 529 | 12/1988 |
| EP | 0 570 976 | 11/1993 |
| EP | 0 677 911 | 10/1995 |
| EP | 0 746 078 | 12/1996 |
| EP | 0 810 713 | 12/1997 |
| EP | 0 963 035 | 12/1999 |
| EP | 0 967 365 | 12/1999 |
| EP | 0 984 552 | 3/2000 |
| EP | 1 191 207 | 3/2002 |
| EP | 1 278 282 | 1/2003 |
| JP | 6-14465 | 1/1994 |
| JP | 6-141470 | 5/1994 |
| JP | 6-327258 | 11/1994 |
| JP | 8-331765 | 12/1996 |
| JP | 9-247863 | 9/1997 |
| JP | 10-257678 | 9/1998 |
| WO | WO 99/27629 | 6/1999 |
| WO | WO 02/20770 | 3/2001 |
| WO | WO 02/37638 | 5/2002 |

OTHER PUBLICATIONS

Dresser-Rand Products & Services, KG Gas Turbines, http://www.dresser-rand.com/turbo/eq/kg_application.asp.

Dresser-Rand Products & Services, KG Gas Turbines, http://www.dresser-rand.com/turbo/eq/kg_productline.asp.

Kim, J.E. and Hwang, J.S., Islanding Detection Method of Distributed Generation Units Connected to Power Distribution System, IEEE, Aug. 1, 2000, pp. 643-647, No. 0-7803-6338-8/00.

* cited by examiner

FREQUENCY AND RESISTOR CURRENT VS. TIME

BLOCK DIAGRAM

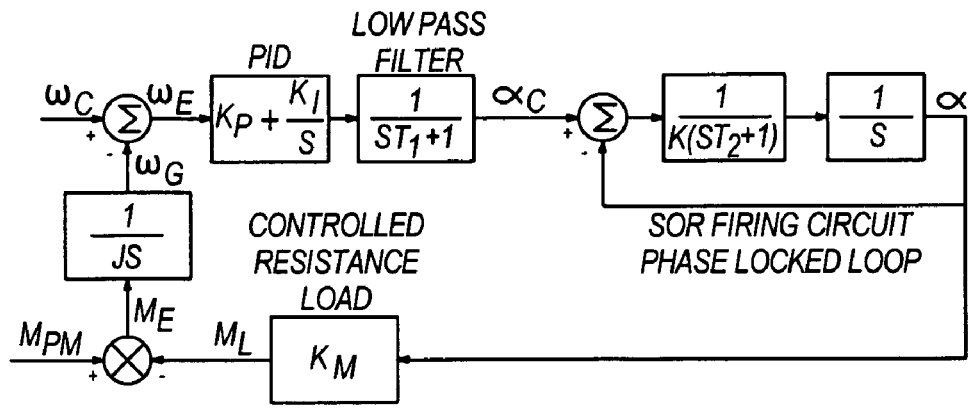

REDUCED BLOCK DIAGRAM WITH $T_2 = .25/K$

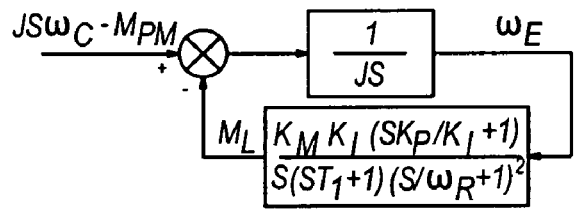

DEFINITIONS

- $M_{PM}$ = PRIME MOVER TORQUE
- $M_L$ = RESISTIVE LOAD TORQUE
- $M_E$ = TORQUE ERROR
- $J$ = MOMENT OF INERTIA
- $K_M$ = RESISTIVE LOAD TORQUE CONSTANT
- $K_P$ = PROPORTIONAL GAIN
- $K_I$ = INTEGRAL GAIN
- $K$ = PLL VCO CONSTANT
- $T_1$ = LOW PASS FILTER TIME CONSTANT
- $T_2$ = PLL FILTER TIME CONSTANT
- $E_G$ = GENERATOR VOLTAGE
- $\omega_C$ = COMMANDED FREQUENCY
- $\omega_G$ = GENERATOR FREQUENCY
- $\omega_E$ = ERROR FREQUENCY
- $\omega_R$ = PLL RESONANT FREQUENCY
- $\alpha_C$ = GATE DELAY ANGLE COMMAND
- $\alpha$ = GATE DELAY ANGLE

FIG. 13

MICROTURBINE ENGINE SYSTEM

RELATED APPLICATION DATA

This application is a continuation of U.S. application Ser. No. 10/464,380 filed Jun. 18, 2003, which is a continuation of U.S. Provisional Application 60/389,765 filed Jun. 18, 2002. The entire contents of both prior patent applications are hereby incorporated by reference.

BACKGROUND

The present invention relates to a system and method for providing electrical power to a priority load. More particularly, the present invention relates to a system and method for providing power to a priority load using a microturbine engine.

Microturbine engines are relatively small and efficient sources of power. Microturbines can be used to generate electricity and/or to power auxiliary equipment such as pumps or compressors. When used to generate electricity, microturbines can be used independent of the utility grid or synchronized to the utility grid. In general, microturbine engines are limited to applications requiring 2 megawatts (MW) of power or less. However, some applications larger than 2 MWs may utilize a microturbine engine.

To operate efficiently, microturbines rotate at a very high rate of speed. As such, they commonly drive a permanent magnet generator or other generator that produces a high-frequency output. An inverter is then used to convert the output to a usable frequency. However, the use of an inverter adds substantial cost to the microturbine engine.

Microturbine engine systems are often subjected to sudden load changes while running isolated from a utility grid. However, due to their relatively slow reaction times, large frequency and/or voltage changes can result. These large frequency and/or voltage changes can be harmful to the equipment powered by the microturbine engine.

SUMMARY

The present invention provides a microturbine engine that includes a compressor that is operable to provide a flow of compressed air. The compressed air flows through a recuperator where it is preheated before delivery to a combustor. The preheated compressed air mixes with a fuel and is combusted within the combustor to provide a flow of products of combustion. The flow of products of combustion expands through one or more turbines to drive the compressor and a synchronous generator. The synchronous generator is able to synchronize to a priority load, to the utility grid or to both, depending on the mode of operation. A control system monitors various engine parameters as well as load and grid parameters to determine the desired mode of operation.

A variable load can be electrically connected to the generator to provide a load sink that allows the generator to change loads more quickly than would be possible using a fuel control alone. The control system operates to maintain the load within the variable load at a desired value by manipulating the fuel flow to the engine.

The engine can also include a black start module that allows the engine to start with no external power supply. The black start module includes a battery or other energy storage device that is able to provide the power needed for start-up.

BRIEF DESCRIPTION OF THE DRAWINGS

The description particularly refers to the accompanying figures in which:

FIG. 13 is a schematic representation of one possible generator frequency regulator loop;

Before any embodiments of the invention are explained, it is to be understood that the invention is not limited in its application to the details of construction and the arrangements of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof is meant to encompass the items listed thereafter and equivalence thereof as well as additional items. The terms "connected," "coupled," and "mounted" and variations thereof are used broadly and encompass direct and indirect connections, couplings, and mountings.

In addition, the terms "connected" and "coupled" and variations thereof are not restricted to physical or mechanical connections or couplings.

DETAILED DESCRIPTION

Figure 2:
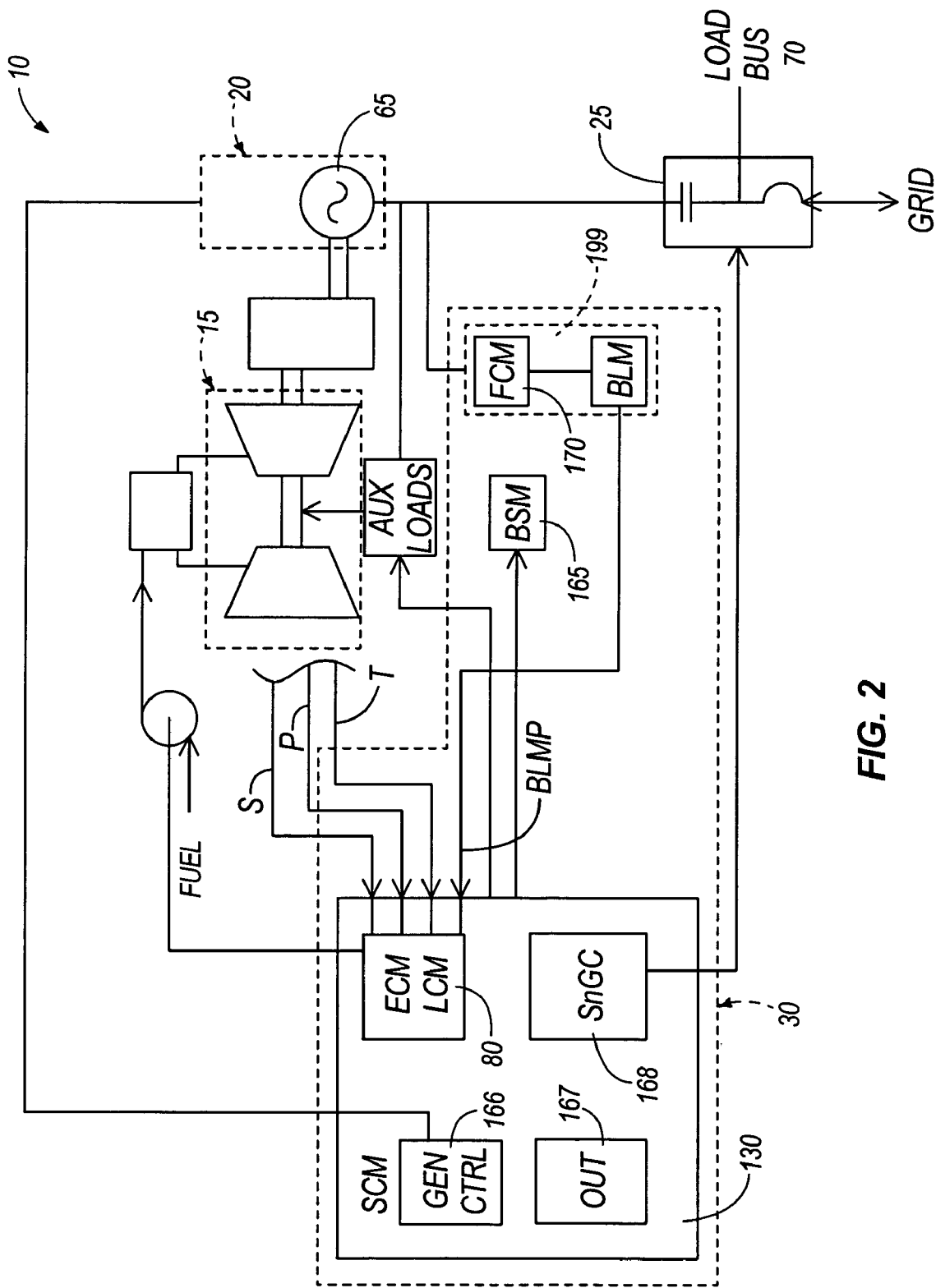
FIG. 2 is a schematic representation of the microturbine engine system.

With reference to FIG. 2, the microturbine engine system 10 includes a turbine section 15, a generator section 20, switch gear 25, and a control system 30.

Figure 1:
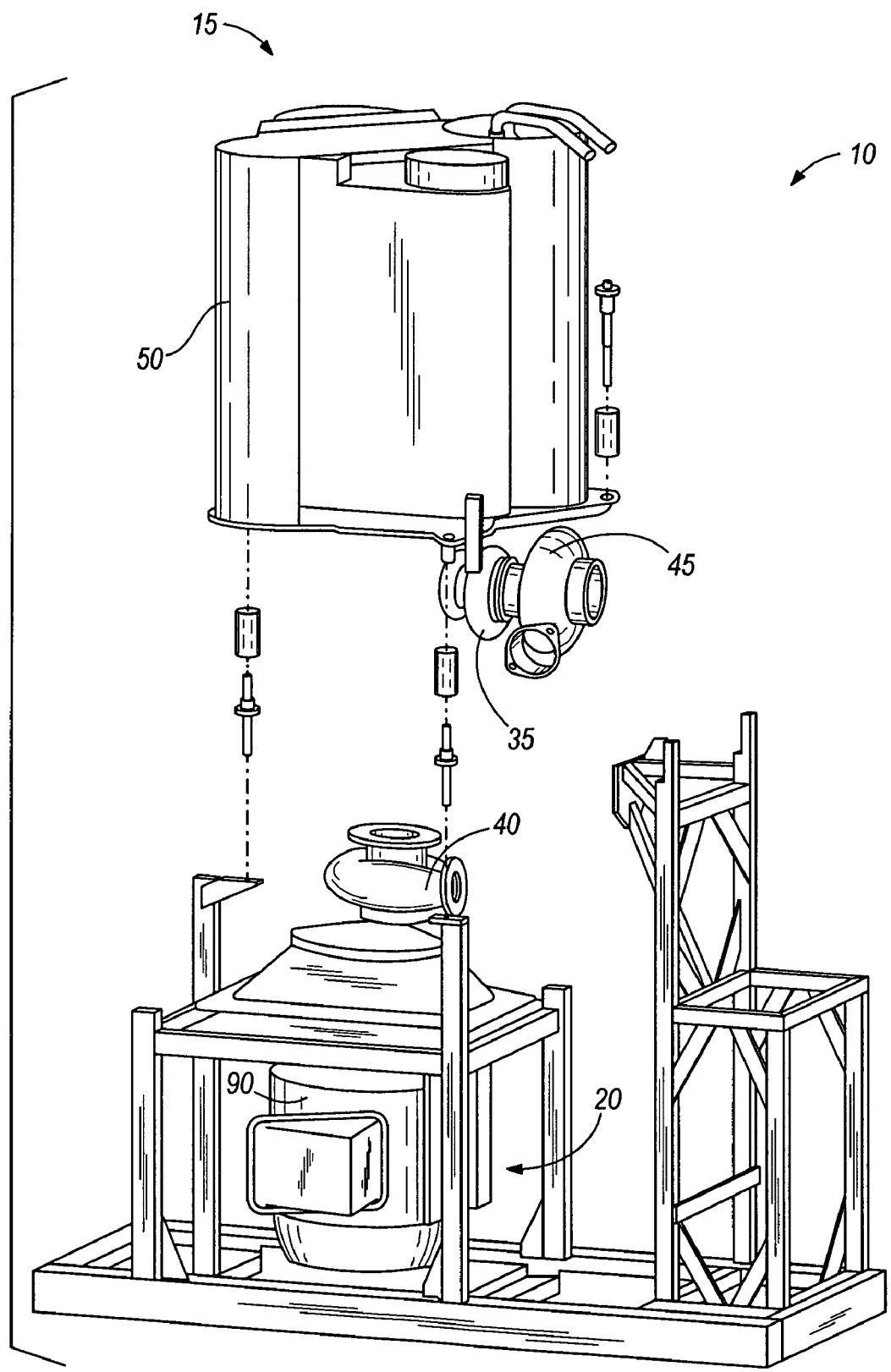
FIG. 1 is a perspective view of an exemplary microturbine engine system of FIG. 1.
Figure 3:
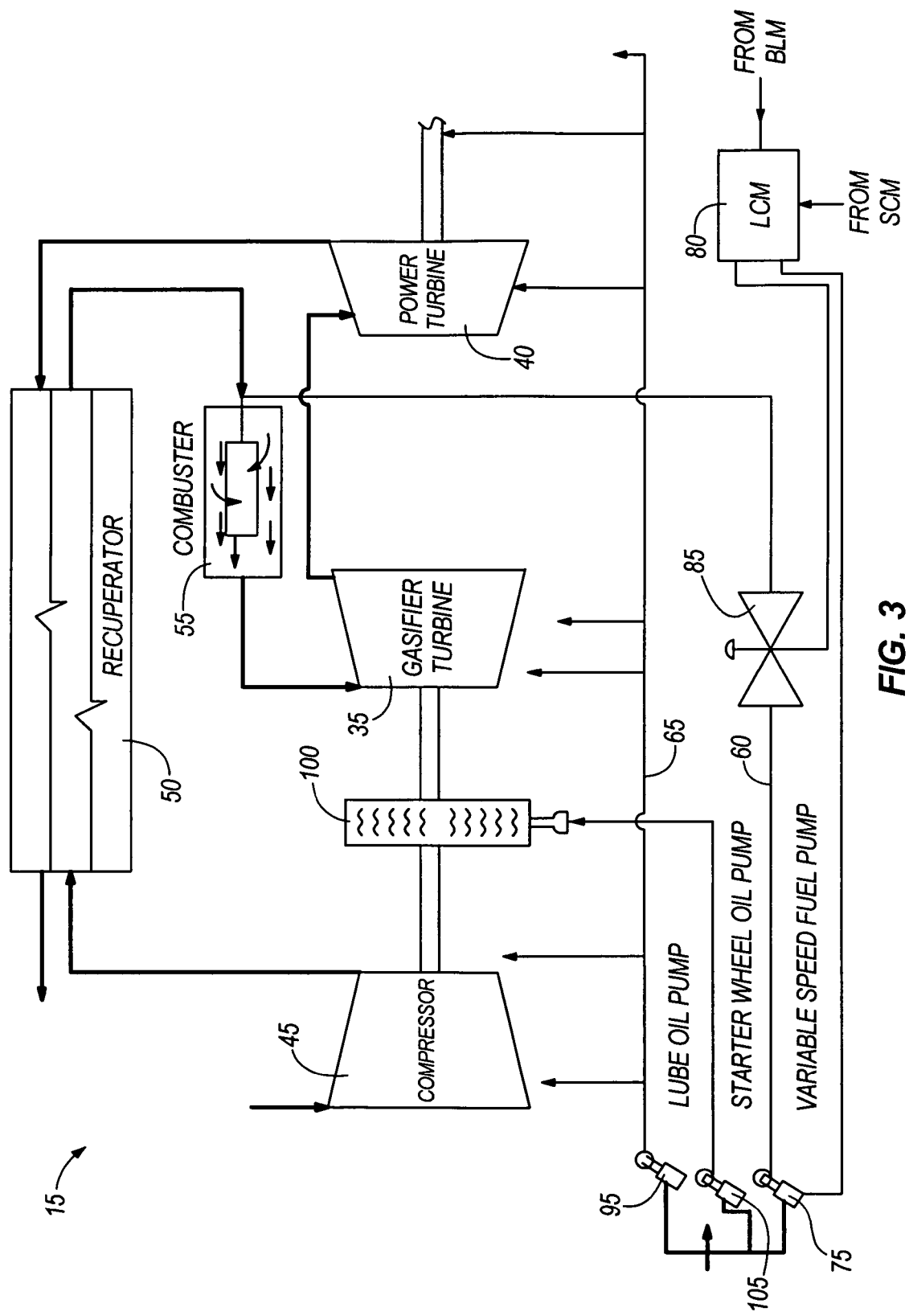
FIG. 3 is a schematic representation of the turbine section of FIG. 2.

The turbine section 15 is schematically illustrated in FIG. 3 and includes a gasifier turbine 35, a power turbine 40, a compressor 45, a recuperator 50, and a combustor 55. The turbine section 15 also includes various auxiliary systems such as a fuel supply system 60 and a lubrication system 65. One construction of a microturbine engine system 10 is illustrated in FIG. 1 and schematically illustrated in FIG. 2.

The turbine section 15, schematically illustrated in FIG. 3, is a standard Brayton cycle combustion turbine cycle with a recuperator 50 added to improve engine efficiency. The engine shown is a multi-spool engine (more than one set of rotating elements). However, single spool engines are also contemplated by the invention. The compressor 45 is a centrifugal-type compressor having a rotary element that rotates in response to operation of the gasifier turbine 35. The compressor 45 shown is generally a single-stage compressor however, multi-stage compressors can be employed where a higher pressure ratio is desired. Alternatively, compressors of different designs (e.g., axial-flow compressors) can be employed to supply air to the engine.

The gasifier turbine 35 is a radial flow single-stage turbine having a rotary element directly or indirectly coupled to the rotary element of the compressor 45. In other constructions, multi-stage turbines or axial flow turbines are employed as gasifier turbines 35. The rotary element of the power turbine 40 extends out of the turbine section 15 and engages the generator section 20 or a gearbox 70 or other speed reducer disposed between the turbine section 15 and the generator section 20, as illustrated in FIG. 2.

The recuperator 50 includes a heat exchanger employed to transfer heat from a hot fluid to the relatively cool compressed air leaving the compressor 45. A recuperator 50 consistent with the turbine section 15 of FIG. 1 is described in U.S. Pat. No. 5,983,992 fully incorporated herein by reference. The recuperator 50 includes a plurality of heat exchange cells stacked on top of one another to define flow paths therebetween. The cool compressed air flows within the individual cells, while a flow of hot exhaust gas passes between the heat exchange cells.

During operation of the microturbine engine system 10, the rotary element of the compressor 45 rotates in response to rotation of the rotary element of the gasifier turbine 35. The compressor 45 draws in atmospheric air and increases its pressure. The high-pressure air exits the air compressor 45 and flows to the recuperator 50.

The flow of compressed air, now preheated within the recuperator 50, flows to the combustor as a flow of preheated air. The preheated air mixes with a supply of fuel within the combustor 55 and is combusted to produce a flow of products of combustion. The use of a recuperator 50 to preheat the air allows for the use of less fuel to reach the desired temperature within the flow of products of combustion, thereby improving engine efficiency.

The flow of products of combustion enter the gasifier turbine 35 and transfer thermal and kinetic energy to the turbine. The energy transfer results in rotation of the rotary element of the turbine 35 and a drop in the temperature of the products of combustion. The products of combustion exit the gasifier turbine 35 as a first exhaust gas flow.

The power turbine 40 receives the first exhaust flow and discharges a second exhaust flow. The rotary element of the power turbine 40 rotates in response to the flow of exhaust gas therethrough. The rotary element of the power turbine 40 is preferably connected through a gearbox 70 (shown in FIG. 2) to the rotary element of the device to be driven, in the case of FIGS. 1 and 2, the generator section 20. The power turbine 40 of FIG. 1 drives the generator section 20 at a fixed speed to produce the desired electrical output (e.g., 3600 or 1800 RPM for a 60 Hz system, 3000 or 1500 RPM for a 50 Hz system).

Figure 19:
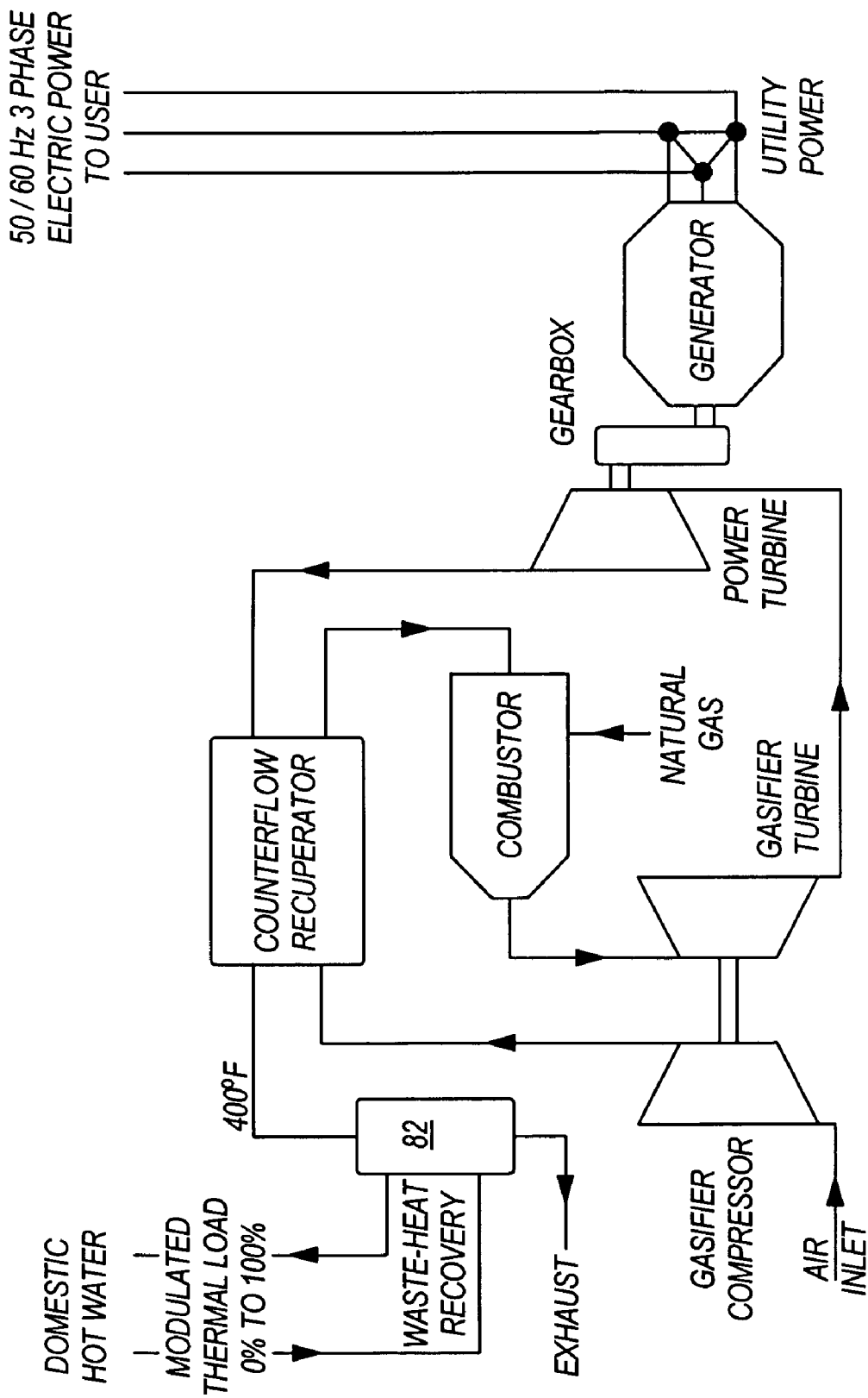
FIG. 19 is a schematic representation of a microturbine engine system including cogeneration.
Figure 20:
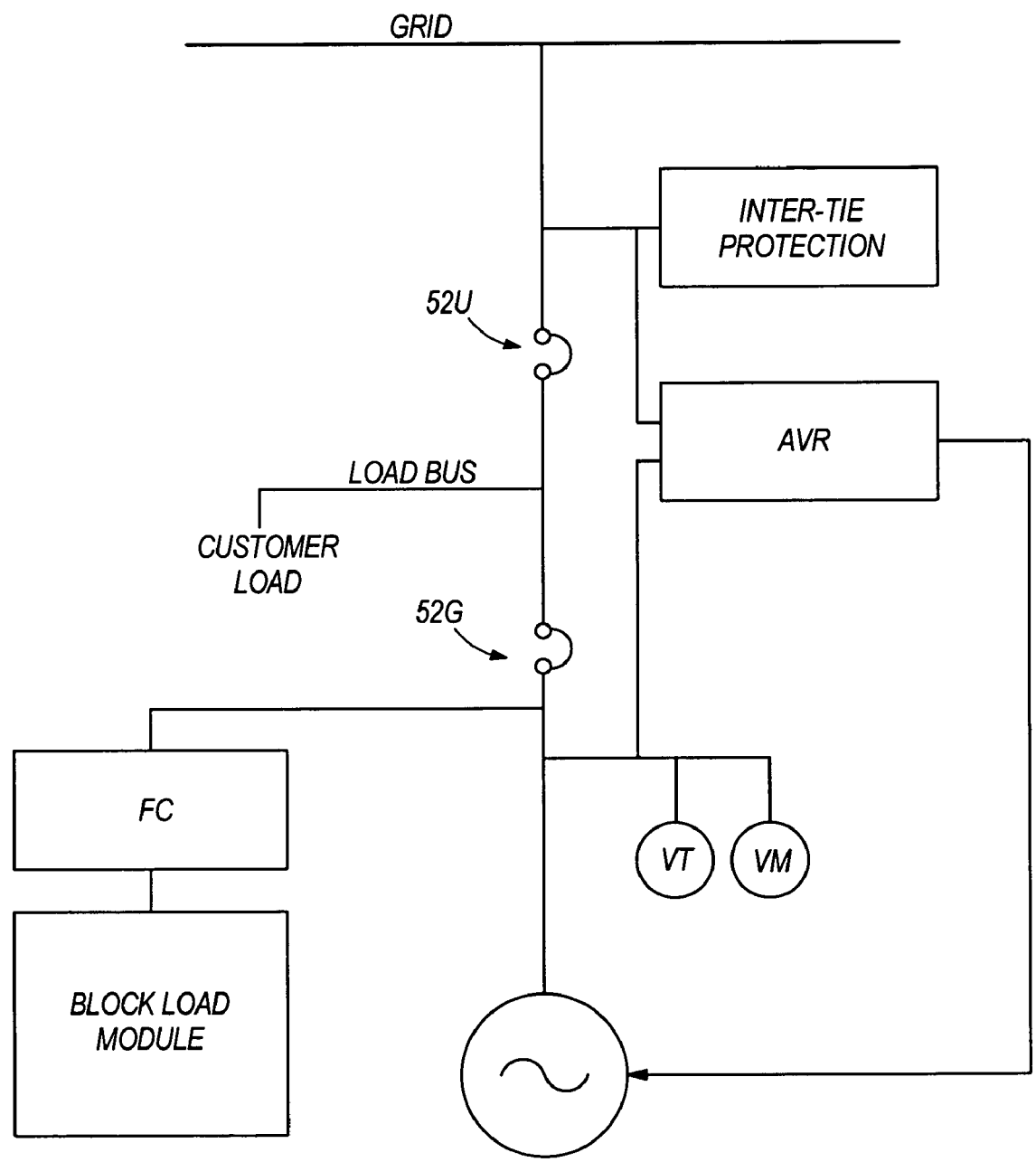
FIG. 20 is a schematic representation of frequency and voltage control connections.

The second exhaust flow enters the flow areas between the heat exchange cells of the recuperator 50 and transfers excess heat energy to the flow of compressed air. The exhaust gas then exits the recuperator 50 and is discharged to the atmosphere, processed, or further used as desired (e.g., cogeneration using a second heat exchanger 82 as shown in FIG. 19).

Radial inflow turbines of the type discussed herein operate most efficiently at very high speeds relative to the equipment they potentially drive (e.g., generators, screw-pumps, gear-pumps, etc.). For example, a gasifier turbine 35 may operate at 50,000 RPM or higher, while a synchronous generator operates at no more than 3600 RPM (to produce a 60 Hz output) and screw-pumps generally operate at about 15,000 RPM. These large speed differentials make multi-spool turbine systems desirable. The gasifier turbine 35 is able to operate at a very efficient speed, while the power turbine 40 operates at the speed needed by the equipment it is driving or at a speed necessary to drive a speed-reducing device.

With reference to FIG. 3, the turbine section 15 also includes the fuel supply system 60 and the lubrication system 65. The fuel supply system 60 includes a fuel pump 75 that draws fuel from a reservoir or other fuel source and supplies the fuel under pressure to the combustor 55. A variable speed motor drives the fuel pump 75 and is controlled by a load control module 80 (shown in FIG. 2) to provide the desired fuel flow to the combustor 55 without the use of a fuel control valve. In some constructions, a fuel control valve 85 is disposed between the fuel pump 75 and the combustor 55. The fuel control valve 85 controls the amount of fuel entering the combustor 55. In other constructions, both the variable speed drive and the fuel flow control valve 85 are used. The variable speed drive controls the delivery pressure of the fuel and the fuel control valve 85 controls the quantity of fuel delivered to the combustor 55 in constructions that employ both components.

A plurality of bearings support the rotary elements of the turbines 35, 40, the compressor 45, and the generator 90 for rotation. The lubrication system includes a lube oil pump 95 that provides a flow of lubricating oil to the bearings to reduce friction and wear, and to cool the bearings. While oil is generally used as the lubricating fluid, other fluids may be used to lubricate and cool the engine components.

In addition, several constructions include a starter wheel 100 coupled to the gasifier turbine shaft. The starter wheel 100 preferably includes a Pelton wheel that receives a flow of high-pressure lubricating fluid to initiate rotation of the gasifier turbine 35 and compressor 45 during the engine start-up sequence. A second high-pressure pump 105 can be employed to supply the stream of high-pressure fluid. Alternatively, a series of valves allow the lube oil pump 95 to supply both the high-pressure stream of fluid to the starter wheel 100 and the low-pressure flow of oil to the bearings.

In addition to the components described above, many turbine sections 15 include various air control mechanisms. For example, a construction of one or both of the turbines can include variable geometry inlet vanes able to move in response to a control signal. The variable geometry vanes change the inlet flow area of the turbines to control the amount of air entering the engine. In another construction of the turbine section 15, a spill valve is disposed between the gasifier turbine and the power turbine. The spill valve allows the flow of exhaust gas flowing to the power turbine to be controlled independent of the air and fuel flow entering the combustor.

While the constructions described in connection with FIGS. 1–3 include a microturbine engine, the microturbine engine system 10 is not limited to a microturbine engine for some aspects of the invention. Other prime movers (e.g., diesel engines, steam turbines, hydro turbines, wind turbines, etc.) can be used in place of the turbine section 15 with some of the elements or components described below.

Generator

Figure 4:
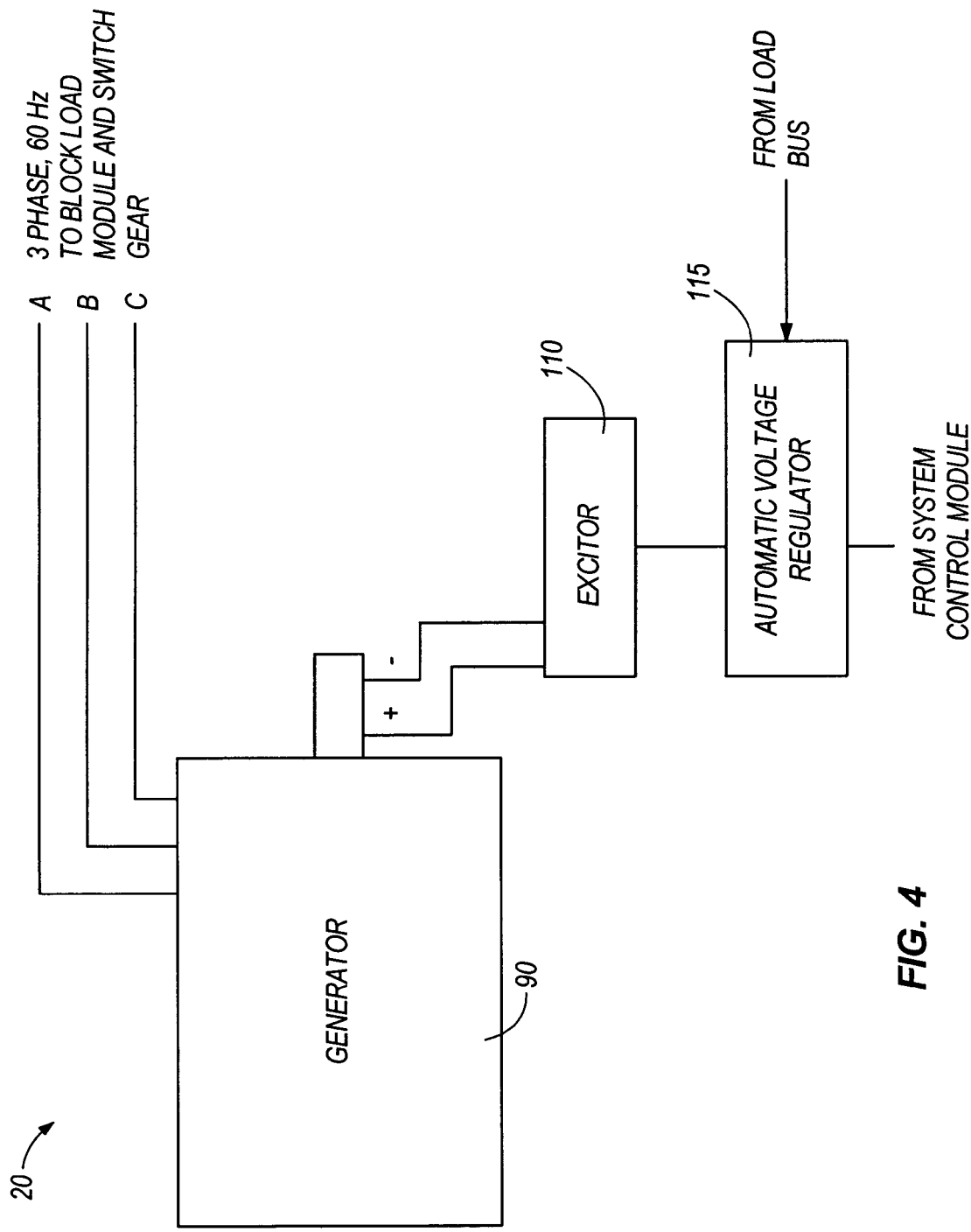
FIG. 4 is a schematic representation of the generator section of FIG. 2.

The generator section 20, shown schematically in FIG. 4, includes the generator 90 driven by the turbine section 15, an exciter 110, and an automatic voltage regulator (AVR) 115. In the construction shown, the generator 90 is a two-pole or four-pole synchronous generator. However, generators having more than four poles can also be used with the invention. The higher operating speed of the two-pole generator 90 allows the power turbine 40 to rotate at a higher speed, or alternatively allows for a smaller speed reduction within the gearbox 70 or other speed reducer.

The generator 90 includes a rotor having at least one magnetic north and south pole, and a stator having three separate sets of windings such that rotation of the rotor produces an alternating three-phase output. In other constructions, a stator having a single set of windings is used to produce single-phase power. In the construction shown, the rotor includes windings that produce the magnetic north and south poles. However, permanent magnets can be used in place of the rotor windings. The output is connectable to the utility grid 120 or to the load bus 125 through the switch gear 25, which will be discussed in detail below.

While the invention is described herein as using a synchronous generator 90, some aspects of the system will function with asynchronous generators. Several modules of the control system will be different for an asynchronous turbine. In addition, some additional modules may be needed, while others may be eliminated.

Generator Excitation

The generator exciter 110 provides a controlled DC power to the generator rotor through a series of concentric coils or windings connected to the generator rotor. The application of the DC current to the windings produces a magnetic field having a north and a south pole. The strength of the magnetic field is based on the magnitude of the DC current. Many different systems are known and available to provide DC power for excitation (e.g., shaft-driven exciter, static exciter, separate motor-generator arrangement, and rotating rectifier (brushless) excitation systems) with brushless excitation systems being preferred.

Automatic Voltage Regulator

FIG. 4 schematically illustrates an automatic voltage regulator 115 controlling the generator exciter 110. As described above with respect to the generator exciter 110, the automatic voltage regulator 115 varies the exciter power to change the generator output voltage or the reactive power supplied.

The AVR 115 receives signals from a system control module (SCM) 130 and the load bus 125 or the generator terminals. The signal from the SCM 130 indicates the operating mode of the engine (i.e., stand-alone or grid parallel). The signal from the load bus 125 or generator terminals indicates voltage or is used to calculate phase angle.

The AVR 115 controls the output voltage of the generator 90 or the operating power factor of the generator 90 or VARs supplied or consumed by the generator 90. When the generator 90 is synchronized to the utility grid (often considered as an infinite bus), the speed of the generator 90 and hence the output frequency are fixed. Additionally, the generator output voltage is fixed. Changes in field excitation under these conditions result in changes in generator reactive power output or VARs. An increase or decrease in VAR output changes the generator power factor. The AVR 115 measures the generator current and compares it with the generator voltage to determine the generator output phase angle. The AVR compares this value to a setpoint value to maintain the desired phase angle.

When the generator 90 is not synchronized, the speed and voltage are variable. The AVR 115 under these circumstances controls the generator output voltage. The AVR 115 receives signals from sensors that indicate the voltage of the load bus 125 or generator terminals. The voltage signal is compared (e.g., in a summing junction) to a setpoint voltage (e.g., 480 V), with the difference representing the error.

Figure 10:
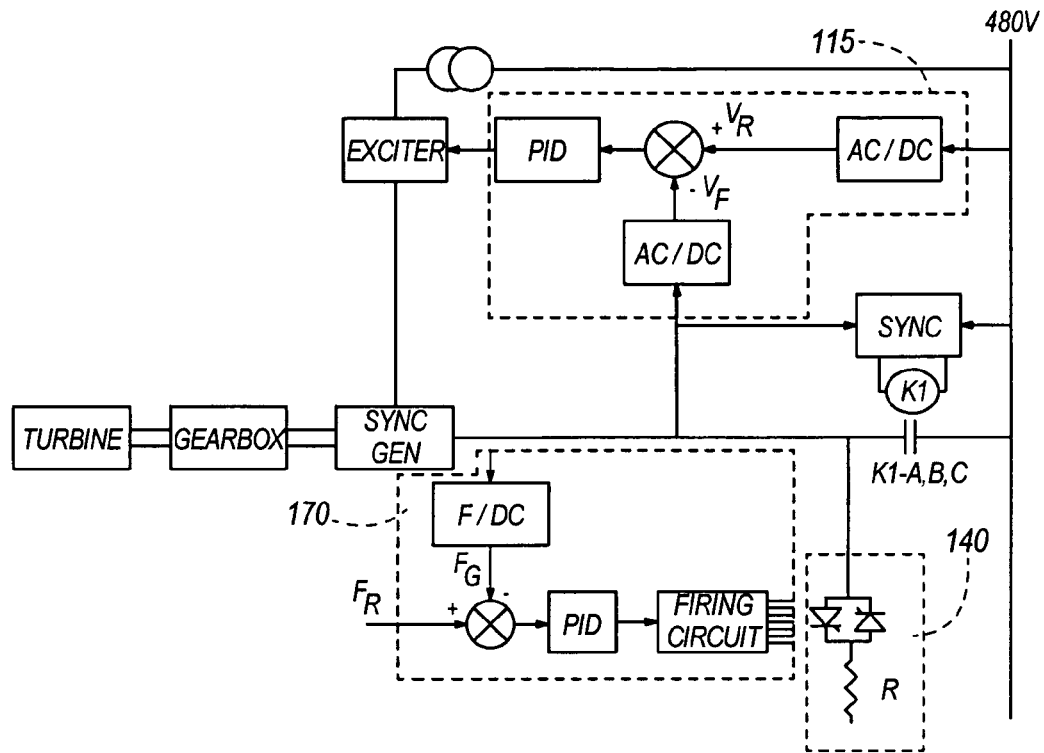
FIG. 10 is a schematic representation of one control scheme for regulating the speed of the generator and synchronizing the generator to the grid or to a load.
Figure 11:
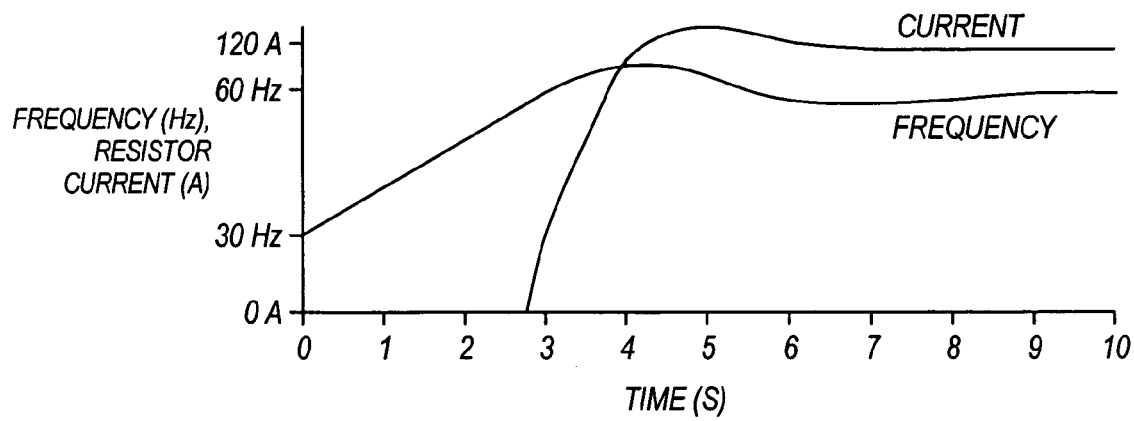
FIG. 11 is a graphical representation of the frequency and resistor current versus time.
Figure 12:
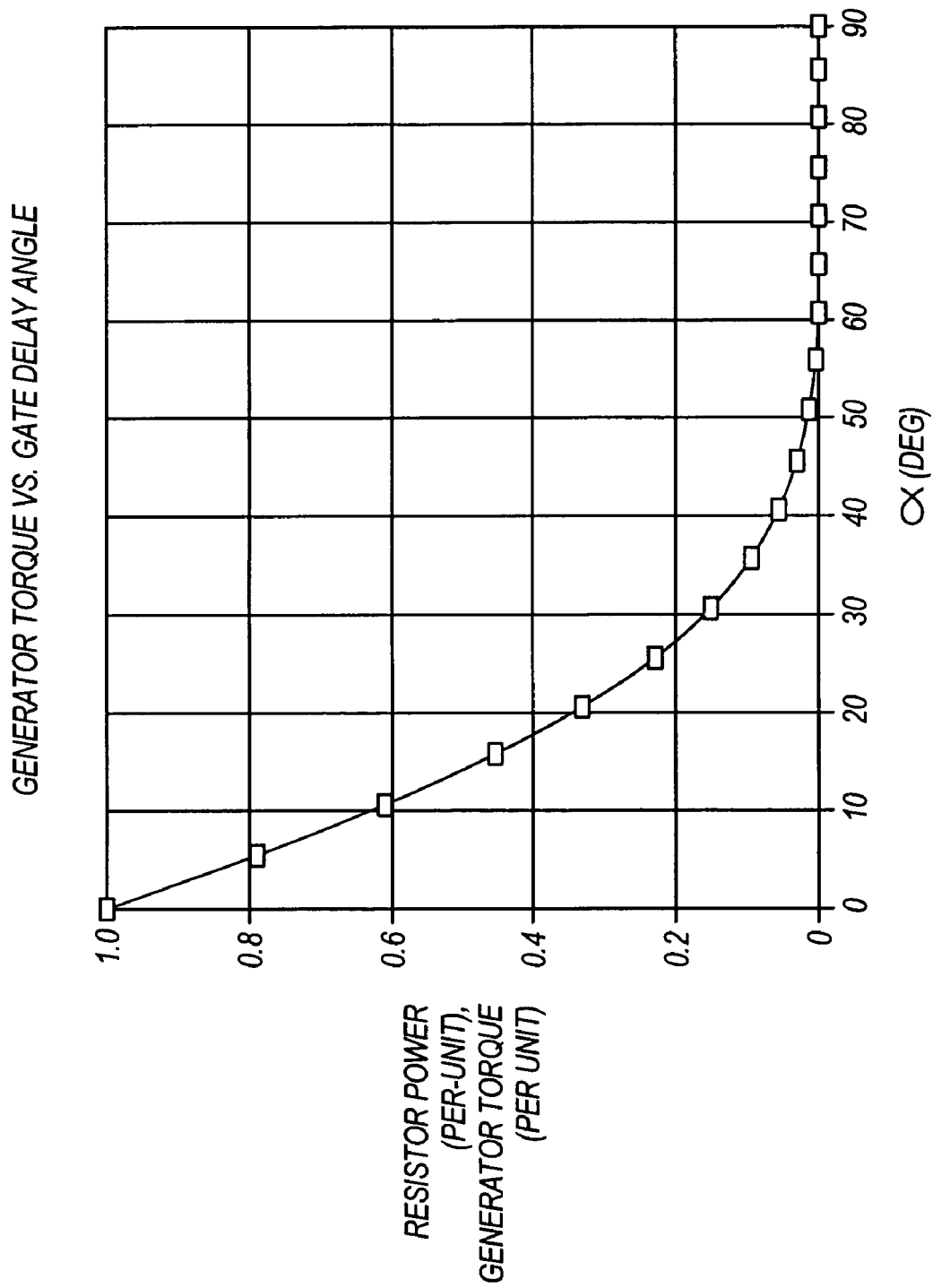
FIG. 12 is a graphical representation of one possible generator torque versus gate delay timing curve.

The proper error value (i.e., between a setpoint phase angle and the actual phase angle when synchronized and between a setpoint voltage and the actual voltage when in stand alone mode), is then used in a closed-loop control within the AVR 115 to maintain the desired voltage or phase angle. Preferred constructions use a PID (proportional/integral/derivative) control scheme implemented through hardware or software as illustrated in FIG. 10. Other constructions may employ other control schemes such as fuzzy logic to control the desired parameter.

Black Start Switches

Figure 5:
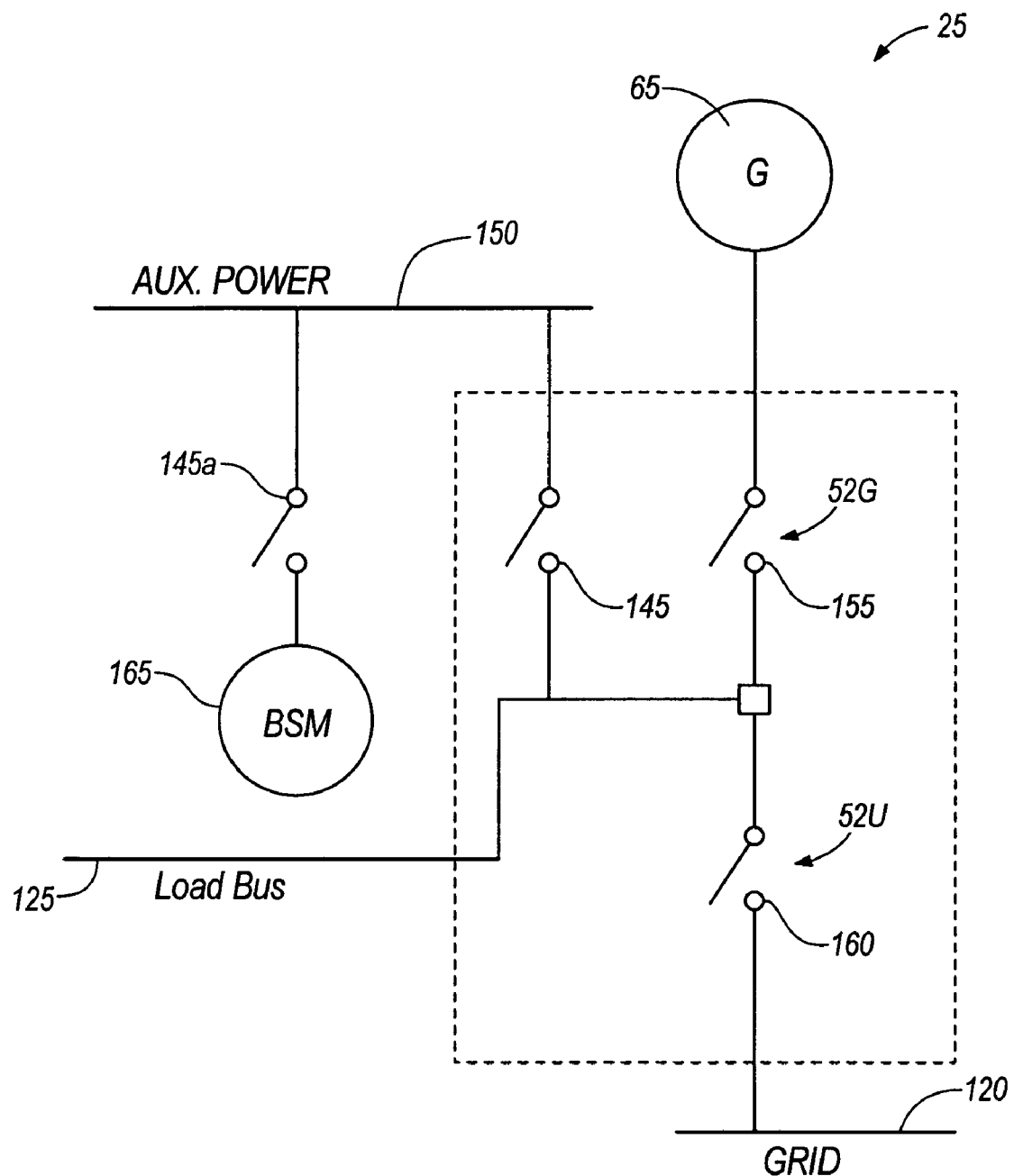
FIG. 5 is a schematic representation of the switch gear of FIG. 2.

In some constructions, the system 10 includes three black start switches 145 (only one phase is shown in FIG. 5) that are closed during normal operation and switched to a black start position for a "black start". A black start is a start up of the microturbine engine system 10 with no available external power. Under these conditions, the black start switches 145, 145*a* isolate the generator 90 and auxiliary power supply 150 from the grid 120 and the load bus 125 to allow the engine 10 to start before additional load is applied. With continued reference to FIG. 5, one possible arrangement of black start switches 145, 145*a* is illustrated. In the construction of FIG. 5, power can be supplied to the auxiliary load bus 150 via the grid 120, the generator 65, or the black start module 165. When the grid 120 is available, power is supplied via closed switch 160 and closed switch 145 to the auxiliary load bus 150. Switch 145*a* may be open or closed to charge the energy storage device within the black start module 165. When the grid 120 is unavailable but the generator 65 is running, power is supplied to the auxiliary load bus via closed switch 155 and closed switch 145. As before, switch 145*a* may be open or closed. Switch 160 is open to isolate the system from the grid 120. When both the grid 120 and the generator 65 are unavailable, both switch 160 and switch 155 are open. Under these conditions power is provided to the auxiliary load 150 bus via closed switch 145*a* and the black start module 165. Switch 145 is open to isolate the auxiliary load bus 150 from the load bus 125.

Figure 7:
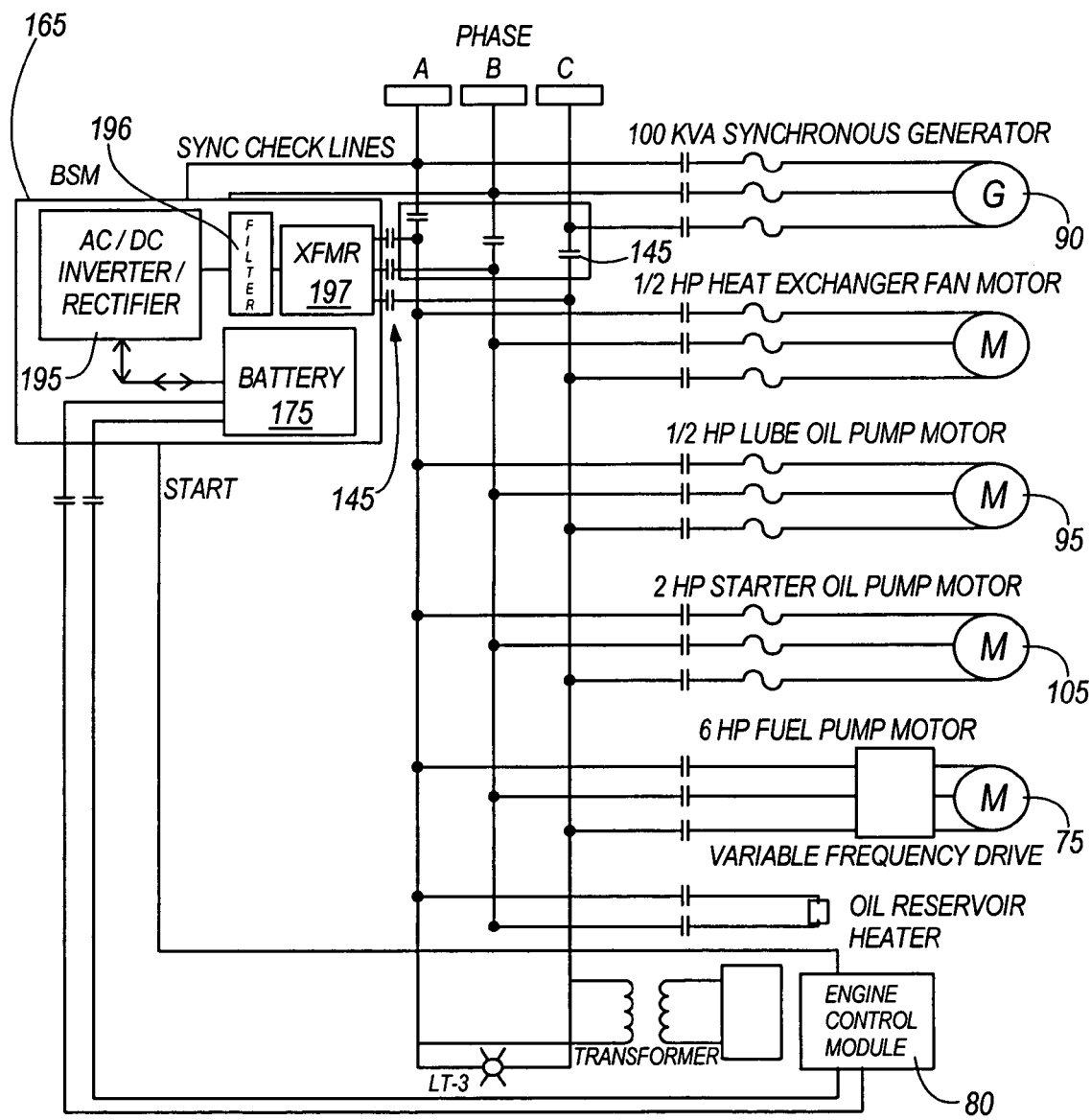
FIG. 7 is a schematic representation of a black start system.

It should be understood that the switches do not need to be located within the switch gear. For example, the construction of FIG. 7 shows the switches schematically within the BSM 165. The physical location of the black start switches 145 is unimportant so long as the switches isolate the generator and the auxiliary power supply from the load bus and the grid.

Switch Gear

The switch gear 135, illustrated schematically in FIG. 5, performs switching necessary to provide generator output power to the utility grid 120, the load bus 125, both, or neither. The switches within the switch gear 135 are controlled via the system control module 130, or using another control module.

Three-phase power flows to the switch gear 135 from the generator 90 and/or a block load module 140, which is discussed in detail below. The first set of switches are a set of generator breakers 155 (52G) (only one phase is shown). These switches 155 connect the generator 90 to the load bus 125, thereby allowing the microturbine engine 10 to provide power to equipment and devices connected to the load bus 125. The final set of switches, a set of utility breakers 160 (52U) (only one phase shown), connect the microturbine engine 10 to the utility grid 120, thereby allowing power to flow from the grid 120 to the load bus 125 or alternatively allowing power to flow from the generator 90 to the utility grid 120. The system control module 130 configures the switches 160 in the switch gear 135 as needed for the different modes of operation.

In a stand-alone mode, the utility breakers 160 remain open and the generator 90 alone provides power to the load bus 125 and the block load module 140. In a grid parallel mode, the utility breakers 160 and the generator breakers 155 are closed, thereby allowing the grid 120 and generator 90 to provide power to the load bus 125 and the black start module 165. The grid parallel mode allows the microturbine engine 10 to respond quickly to a sudden loss of the utility grid 120. In a black start mode, the utility breakers 160 and the generator breakers 155 are open, while the black start breakers 145 are in the black start position (e.g., open). In yet another arrangement, only the utility breakers 160 are closed such that the load bus receives power from the utility grid 120 alone. Other switch configurations are possible and may be desirable under certain operating conditions.

System Control Module (SCM)

The System Control Module (SCM) 130, illustrated schematically in FIG. 2, provides overall control and monitoring of the microturbine engine system 10.

For the construction described herein, the SCM 130 includes one or more processors, one or more memory devices having one or more software modules, one or more input devices (e.g., switches, pushbuttons, keyboard or keypad, a pointing device, a touch screen, or even another controller connected via a network) that receive inputs, and one or more output devices (e.g., a display, a warning or alarm indicator, a switch, an audible alarm or warning, a hardcopy generating device, a soft copy generating device, or even another controller connected via a network) for providing outputs. In addition, the SCM 130 includes other circuitry (e.g., drivers, conditioning circuitry, amplifiers, A/D converters, switches, and summing circuits) that would be apparent to one skilled in the art.

While there are many arrangements possible for the various control functions, one arrangement is illustrated in FIG. 2. In the arrangement of FIG. 2, the SCM 130 includes a generator control 166, an operator user interface (OUI) 167, a switch gear control 168, and the load control module 80. The generator control 166 includes the automatic voltage regulator 115 and also maintains routine generator protection functions. The OUI 167 provides an interface between the user and the microturbine engine system 10. It is the user interface that allows the user to perform many functions including but not limited to changing operating modes, varying the power factor or output, monitoring system function, and starting or stopping the engine 10. The switch gear control 168 monitors and controls the switch gear.

The SCM 130 receives inputs from, and provides outputs to, the engine components, utility protective relay, a black start module 165, a frequency control module 170, the generator protective relays, the utility breaker status (52U), the block load module 140 and the generator breaker status (52G). The SCM 130 may also receive various inputs from the user (e.g., the mode of operation, a power output set-point, and start and stop signals). In addition, various operating parameters (e.g., gasifier turbine speed, fuel flow, generator speed, output voltage, and output frequency) may be input to the system control module 130. Also, the system control module 130 provides for monitoring and warning functions. The SCM 130 can monitor parameters such as bearing temperatures, turbine temperatures, generator voltage, frequency, etc. Many of the monitored values have alarm settings or trip settings that, if exceeded, would require the SCM 130 to take action such as immediately shutting down the microturbine engine system 10. The SCM 130 therefore acts as a central control point for all protective functions.

The SCM 130 provides overall control of the microturbine engine system 10 and various other control packages (e.g., load control module 80, frequency control module 170, automatic voltage regulator 115, etc.). However, it should be understood that some of the functions performed by the SCM 130 could be performed by the other control packages and the SCM 130 could perform some of the functions of the other control packages if desired. For example and in one construction, a separate control module for monitoring operating parameters is employed. The module simply sends a trip signal to the SCM 130 if any one of the monitored parameters exceeds a preset value, thereby relieving the SCM 130 of the burden of monitoring operating parameters.

The microturbine engine system 10, as controlled by the SCM 130, operates in one of several modes. In stand-alone mode, the microturbine engine system 10 completes a start sequence and operates at speed with no load applied. The generator breakers 155 are closed, thereby connecting the generator 90 to the load bus 125. The output of the generator 90 follows the load on the load bus 125 (shown in FIGS. 16–17). However, if the demand exceeds the output capability of the engine 10 the system the frequency will drop until certain shutdown conditions are met, at which time the system automatically initiates a shutdown. When operating in stand-alone mode, the AVR 115 maintains the voltage at the load bus 125 within a desired range. The SCM 130 signals the AVR 115 that the engine is operating in stand-alone mode and the automatic voltage regulator 115 adjusts the generator output voltage based on the system load to maintain a constant voltage at the load bus 125.

The microturbine engine system 10 can also be operated in grid-connected or grid-parallel mode. In this mode the generator 90 is synchronized to the grid 120 and is able to deliver power to the grid 120 and/or the load bus 125. A programmed schedule can be maintained, wherein the generator 90 supplies a fixed amount of power during a fixed period of time, as shown in FIG. 15. The generator 90 can also be run in a peak-shaving mode, illustrated in FIG. 14. In the peak-shaving mode, the microturbine engine system 10 operates whenever electricity consumption exceeds a predetermined value. The SCM 130 determines which of the modes is desired and provides signals to the load control module 80, the block load module 140, or other modules, the provided signals corresponding to the desired mode of operation.

Yet another mode of operation is the back-up mode. When the system detects an interruption in the grid supply, the microturbine engine is started and brought up to speed with no load applied. The SCM 130 configures the switch gear 135 so that the utility breakers 160 are opened and the generator breakers 155 are closed, thereby allowing the generator 90 to pick-up the load on the load bus 125. When the grid 120 returns or the grid fault is corrected, the microturbine engine system 10 synchronizes to the grid 120, closes the utility breakers 160, transfers load to the grid 120, opens the generator breakers 155, and shuts down the microturbine engine.

The SCM 130 provides for a closed transition from grid parallel mode to stand-alone mode. The SCM 130 maintains the utility breakers 160 in the closed position as the generator 90 picks up the load on the load bus 125. Once the generator 90 has picked-up the load, the utility breakers 160 are open, thereby providing for a smooth transition from grid parallel to stand-alone mode. The delayed tripping of the utility breakers 160 prevents nuisance tripping by assuring that the generator 90 is capable of picking up the system load on the load bus 125. Without the delayed trip of the utility breakers 160, the sudden shift in load to the generator 90 could cause a sudden voltage or frequency drop large enough to trip the microturbine engine system 10. The delay allows the turbine to reach the desired speed and further allows the generator 90 to slowly pick-up load.

Yet another mode of operation is running backup mode. During operation in running backup mode the generator is synchronized to the grid 120. If the system 10 detects an interruption in the grid 120, the SCM 130 opens the utility breakers 160 immediately and keeps the generator breakers 155 closed, thereby allowing the generator 65 to continue to supply power to the priority loads of the load bus 125. When the grid 120 returns or the grid fault is corrected, the microturbine engine system 10 synchronizes to the grid 120 and closes the utility breakers 160.

The SCM 130 is also flexible enough to function with any utility protective relay package, and any switch gear system. In addition, the SCM 130 will allow auto-synchronization of the generator 90 across multiple switching devices.

The SCM 130 and other control modules are flexible enough to allow for many other modes of operation as well as variations in the already described modes. In addition, many of the control functions are separate from the SCM 130, thereby allowing for easier changes to individual portions of the system.

Figure 8:
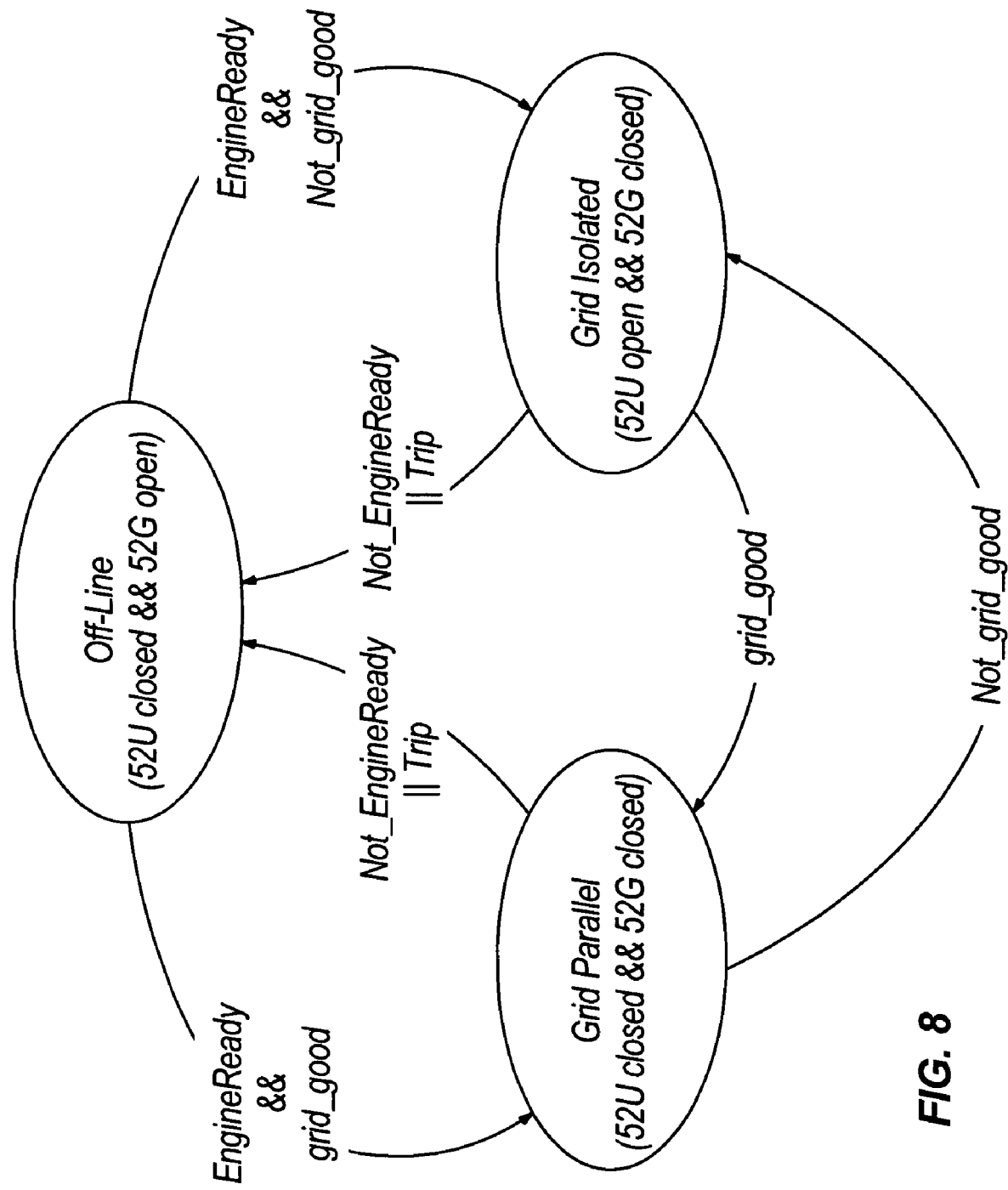
FIG. 8 is a schematic state diagram illustrating some operating modes of the system as configured by the SCM.

FIGS. 8–11 illustrate schematically the different modes of operation under the SCM 130. FIG. 8 is a state diagram illustrating the different switch configurations and modes of operation that the microturbine engine system 10 typically operates.

Load Control Module

In addition to the SCM 130, other control modules include the load control or engine control module 80, the frequency control module 170, the black start control module 165, the automatic voltage regulator 115, and the block load module 140. The load control module (LCM) 80 controls the speed of the fuel pump 75 and, in some constructions, the fuel control valve position.

Figure 21:
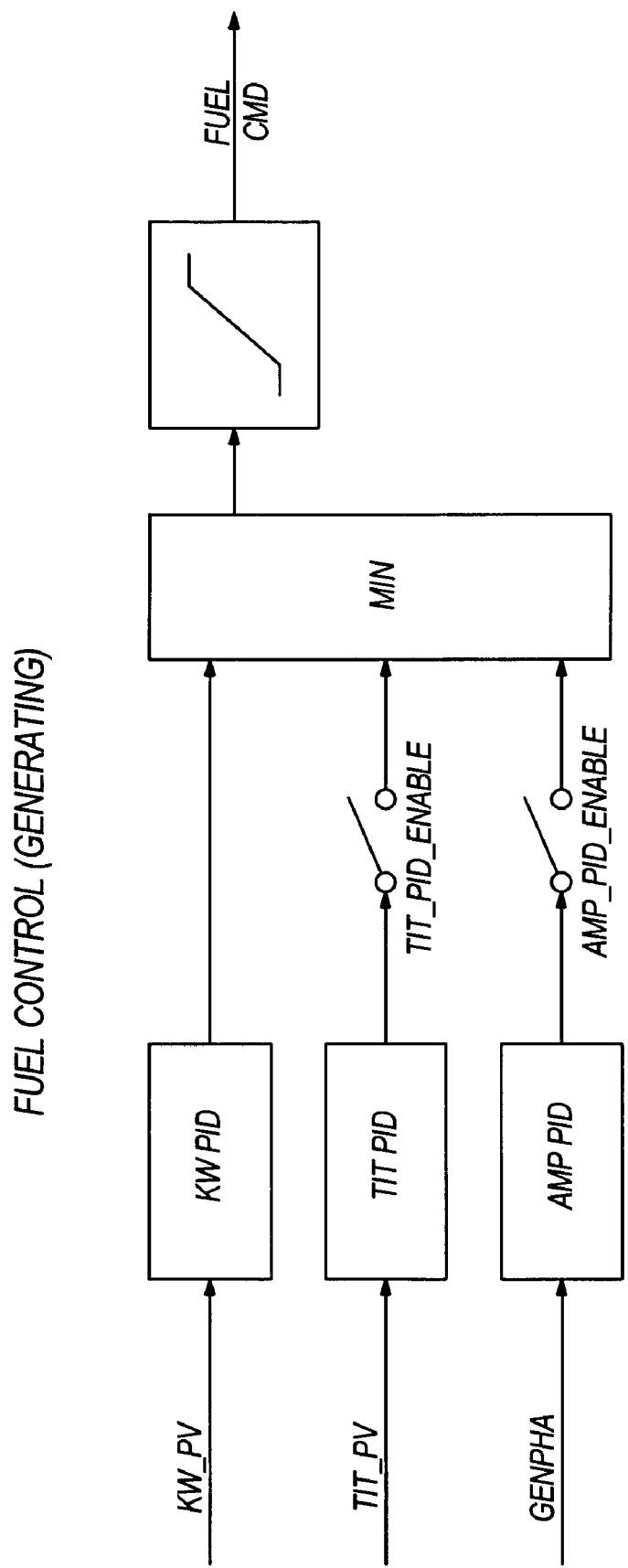
FIG. 21 is a schematic representation of a fuel control scheme.

In many constructions (illustrated in FIGS. 2 and 21) the load control module uses several inputs to determine the desired output. For example, the system of FIG. 2 includes a speed input S, a total power input P, a turbine temperature input T, and a block load module power input BLMP. The load control module determines a fuel adjustment based on each of the inputs and chooses the input that results in the minimum fuel flow to control. Many different inputs can be used in this type of control scheme.

The load control module 80 operates in conjunction with the block load module 140 (BLM) and the frequency control module 170 (FCM) to control the speed and/or power output of the microturbine engine system 10. The SCM 130 sends a signal to the LCM 80, FCM 170 and the BLM 140 corresponding to the operating mode. The LCM 80, FCM 170 and BLM 140 operate differently depending on that mode.

During stand-alone operation, the load control module 80 controls the speed of the gasifier turbine 35 and the power turbine 40 by varying the fuel flow to the combustor 55. When using a synchronous generator 90, the generator 90 rotates at the proper speed to produce electricity having the desired frequency (e.g., 3600 RPM for 60 Hz output using a two-pole generator). To aid the LCM 80 and provide a more consistent frequency output, the frequency control module 170 assists the LCM 80.

For example, as load drops from the load bus 125 in stand-alone operation, the generator 90 will accelerate slightly. The FCM 170 will detect the higher speed as an increase in the generator output frequency. The FCM 170 employs a control scheme (e.g., PID, Fuzzy, etc.) to control the BLM 140 (discussed in detail below). The FCM 170 quickly adds load from the block load module 140 to maintain the generator output at the desired frequency.

The generator 90 continues to generate a fairly constant load as load is smoothly transferred between the load bus 125 and the BLM 140 by the FCM 170. The load transfer allows the FCM 170 to accurately maintain the desired output frequency and responds much quicker than the mechanical control systems.

The LCM 80 monitors the power flow to/from the block load module 140 with a desired absorbed power quantity being a user settable value. Another control scheme, preferably a PID control, within the LCM 80 maintains the fuel flow at a rate that corresponds to the desired power quantity into, or out of, the BLM 140. Continuing the above example, upon detecting a sudden load drop on the load bus 125 the FCM 170 shifts excess power to the block load module 140, thereby maintaining the desired output frequency. The LCM 80 detects an increase in the power flow to the block load module 140 and begins reducing the speed of the fuel pump 75, thereby reducing the power generated by the system 10. As power drops off, the FCM 170 detects a reduction in the generator frequency and begins reducing the load within the block load module (BLM) 140, thereby reducing the total load on the generator 90. This continues until the LCM 80 eliminates the error in the amount of power flowing to the BLM 140.

In actual operation, the speed changes of the generator 90 are small and the FCM 170 maintains generator output within a tight frequency band (e.g., 59.8 Hz to 61 Hz).

In grid parallel mode, the FCM 170 or another device synchronizes the generator 90 to the utility grid 120, thereby fixing the speed of the generator 90 along with the frequency and voltage of the generator output. A sudden addition or subtraction of load at the load bus 125 has no effect on the speed of the generator 90 and is instead absorbed by the grid 120.

The LCM 80 maintains the desired power output of the generator 90 by varying the speed of the fuel pump 75. The SCM 130 determines what the desired power output will be based on several factors. If the engine is in peak-shaving mode, the SCM 130 will calculate the power output required to maintain the power input from the grid 120 at or below a predetermined value. If the engine is in a preprogrammed mode, the SCM 130 will send a signal to the LCM 80 corresponding to the desired output at the specific time.

In other constructions, the load control module 80 controls load through multiple control devices in addition to the fuel pump speed. For example, the load control module 80 could control movable turbine inlet vanes, thereby controlling the flow of gas into the turbines. In addition, the load control module 80 could control a spill valve located between the gasifier turbine 35 and the power turbine 40.

Frequency Control Module

The frequency control module (FCM) 170, as described above, assists the load control module 80 in controlling the turbine (or other prime mover) during transients. The FCM 170 provides a resistive load (e.g., quick-acting thyristor controlled shunt resistive load) that can be applied to the generator 90 to control the speed and instability inherent during certain transients (e.g., start-up and load rejection). In addition, the FCM 170 provides a minimum base load for the generator 90 during stand-alone operation. In preferred constructions, the resistive load is part of the BLM 140. The BLM 140 may include a bank of batteries 175, a bank of resistors 180, ultracapacitors (ultracaps) 185 and/or any other energy storage or energy dissipation device.

It should be noted that other constructions incorporate the FCM 170 into another device, such as the LCM 80. Thus, these constructions do not include a separate physical device that functions as the FCM 170. Rather, the function of the FCM 170 is performed by the other module.

The FCM 170 regulates the speed of the generator 90 by augmenting the slow-acting engine or turbine control with a quick-acting thyristor controlled shunt resistive load. The shunt load speed regulator operates in both the stand-alone and the grid connected modes.

In the stand-alone mode, the frequency overshoot resulting from a load rejection can be quickly snubbed by the application of the shunt load, which is applied as a function of the deviation of the generator frequency from the nominal frequency. The shunt resistive load can also augment the customer's load to maintain a minimum load on the prime mover. This is especially important for the microturbine, which cannot maintain stable combustion at less than a certain minimum load. Water-cooled resistor elements can be used to allow a portion of the shunt resistor energy loss to be recovered and added to the energy recovered from waste engine heat.

In the grid-connected mode, the FCM 170 will greatly reduce the time required to synchronize the generator 90. This is important in the application of microturbines that drive utility frequency synchronous generators. These turbines are unable to operate at low power. Consequently, acceleration is substantial as the generator frequency approaches the utility frequency, and this makes it difficult to achieve a smooth (bumpless) connection to the grid 120. The shunt load is applied shortly before the generator frequency reaches the grid frequency and acts to bring the acceleration close to zero at the time that the two frequencies match. A conventional generator synchronizer 190 and voltage regulator are then able to connect the generator 90 to the grid 120 when the generator and grid voltages match in amplitude and phase. In active synchronization constructions, the FCM responds to errors between the grid phase angle and the generator phase angle to further improve synchronization time.

The shunt load FCM 170 also functions with quick-start diesel powered generators that backup UPS systems. The conventional diesel-backed UPS uses a battery as the energy source until the governor brings the engine up to speed so that a synchronous transfer can be made from the UPS inverter to the generator. Newer battery-less systems use flywheel or superconductor energy storage. These systems do not have the long-term energy capacity of a battery bank and thus require a rapid-start prime mover to quickly support the UPS load in case of a grid outage. However, even with a pre-warmed engine, the generator cannot be accelerated to the grid frequency at maximum engine power (or minimum time) because of the large frequency overshoot and long settling time that would result due to the slow response of the engine governor. By permitting the engine to accelerate at full throttle, the FCM 170 will allow the generator to support the UPS system in the shortest possible time. The time-to-synchronize can be further reduced by using a thyristor static switch instead of the usual electromechanical contactor to make the generator-to-grid connection.

Figure 9:
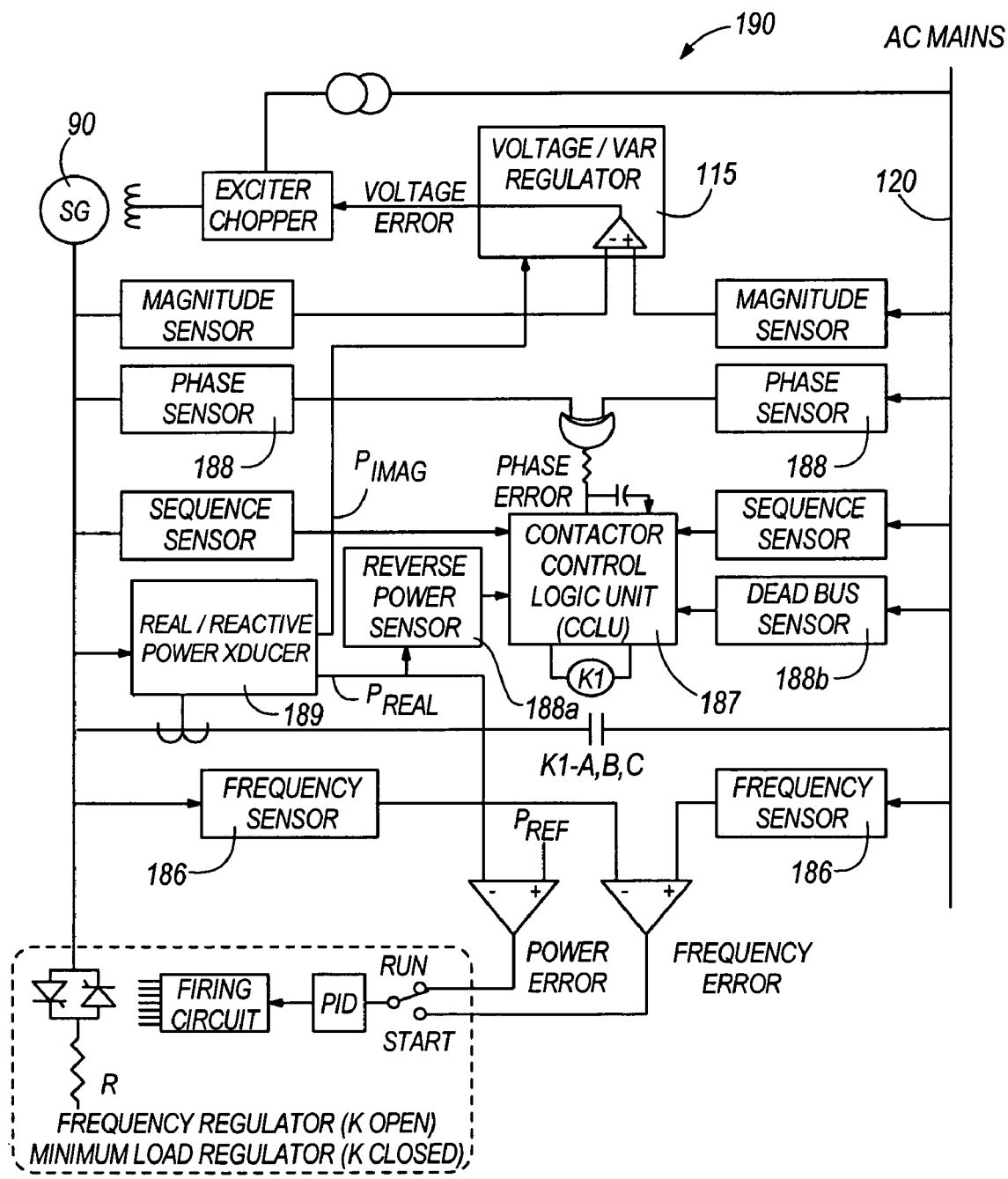
FIG. 9 is a schematic generator control drawing illustrating one possible control scheme within the frequency control module.

The system concept is explained in the context of a grid-connected microturbine or diesel powered generator. Operation in the stand-alone mode is considerably simplified. The elements of the FCM 170 and grid synchronizer 190 are shown in FIGS. 9–10.

The FCM 170 goes into operation after the generator 90 is accelerated by the prime mover up to about 95% of the grid frequency, corresponding to a slip of 5%, in an asynchronous or induction generator. The generator and grid frequencies are converted to analog voltage signals by the two frequency sensors 186. These frequency signals are applied to a differential amplifier to form a frequency error signal. This is applied to a proportional/differential/integral (PID) transfer function that forms the thyristor gate delay command for the AC controller firing circuit. When the frequency error is large, the firing circuit gate delay angle is advanced toward zero degrees to turn the thyristors fully on. This applies full generator voltage to the three phase load resistor and loads the generator with 100% (or more) of rated power. Acceleration decreases as the generator frequency approaches the grid frequency. The PID controller acts on the frequency error to produce the thyristor gate delay angle required to make the generator frequency match the grid frequency.

After the synchronizing switch is closed, the load resistor current is slowly reduced to zero to avoid a load dump transient.

The generator 90 is loaded with the thyristor controlled three-phase resistor to bring the acceleration to zero prior to synchronization. The load bank resistance is selected to produce 1.0 per-unit short-term power. The continuous power rating is 0.3 per-unit as required to maintain a minimum specified prime mover load.

The load resistors 180 can be water cooled to allow conversion of the minimum load electrical power into heated process water to be used along with the waste heat from the prime mover.

FIGS. 9–13 illustrate schematically one possible control system employed by the FCM 170.

While preferred constructions use thyristor controlled load banks, other constructions may employ a Contactor Control Logic Unit (CCLU) 187. The CCLU 187 utilizes three XOR logic devices (shown as one device in FIG. 9) to create a DC voltage signal proportional to the phase difference between the generator and grid voltage. When the phase difference voltage indicates an in-phase condition or, low slip frequency with asynchronous generators, by remaining in the low state for a sufficiently long period, one of the conditions for closing the utility breakers 160 is satisfied.

The output of the Voltage Error Sensor is an analog voltage that is also an input to the CCLU. The second criterion for closing the utility breakers 160 is satisfied when the voltage error signal indicates that the generator and grid voltage amplitudes are substantially equal.

The CCLU also receives inputs from the generator and grid voltage phase sequence sensors 188, the reverse power sensor 188a, and the dead bus sensor 188b. The final criteria for closing the utility breakers 160 are satisfied when these sensors indicate normal operation.

The generator 90 will generally be equipped with a pilot exciter requiring about 10 ADC or less of control winding current. This can be provided by an exciter chopper (DC/DC converter). The exciter chopper obtains its supply voltage from the grid via a transformer and rectifier. The chopper is controlled by the signal output of the Voltage Error Sensor.

After the utility breakers 160 are closed, the exciter 110 regulates the generator main field current to prevent placing a reactive power demand on the grid supply. The feedback signal for reactive power control is the PIMAG signal from the Real/Reactive Power Transducer 189. The exciter 110 can also regulate the generator main field current to inject reactive current into the grid 120 within the thermal limitation of the generator 90.

The real power signal PREAL from the power transducer 189 is applied to a power error amplifier along with a threshold voltage that represents power command of typically 30% of rated power. When the actual power is less than a specified fraction of the prime mover rating, the PID unit adjusts the firing circuit gate delay command voltage to produce the required minimum load. The load resistor bank 180 can be made up of readily available water-cooled resistors to augment the Combined Heat and Power function of the diesel engine or gas turbine.

The above discussion has been aimed at the grid-connected application. The thyristor controlled load resistance is also a valuable addition to a stand-alone synchronous generator 90 powered by a microturbine or a direct drive diesel engine. The resistance can maintain the minimum required load and its rapid response capability can be used to augment the prime mover throttle control in stabilizing the generator frequency.

The ability to rapidly control prime mover retarding torque permits the quick synchronization of rapid-start prime mover driven generators in UPS applications. The diesel, turbine or other prime mover engine can be accelerated at full throttle with all frequency and phase matching performed by the thyristor controlled load resistance.

The thyristor controlled resistors 180 will cause some distortion of the generator voltage. This is not a factor during the acceleration phase when the normal load is not connected. Distortion will be greater in the stand-alone mode because of the higher source impedance. Distortion should be moderate because the maximum resistor current will be about one-third of the rated current. AC reactors placed in series with the resistors 180 will allow the generator to meet the 5% TDD (Total Demand Distortion) limit imposed by IEEE-519.

Preferred constructions use thyrister controlled resistor banks 180 because they allow for more discrete control of the load being applied to the generator 90. Other constructions using a CCLU 187 use a series of resistors 180 that are connected or disconnected to the grid 120 using a PLC or other controller. In these constructions, load can be added in quantities equal to the smallest resistor available.

Generator Synchronizer

The generator synchronizer 190 performs several functions to synchronize the generator 90 to the grid 120. Prior to closing the utility breakers 160 between the generator 90 and the grid 120, the synchronizer 190 verifies that the generator phase sequence is correct and that bus voltage is present. If either of these conditions are not met, the prime mover initiates a shutdown or runs in stand-alone mode. The synchronizer 190 regulates the generator speed through the FCM 170 as the generator frequency approaches the grid frequency. In addition, the synchronizer 190 regulates the generator voltage through the AVR 115 to match the grid voltage. The synchronizer 190 will close the utility breakers 160 when three conditions are met. First, the phase difference between the generator output and the grid 120 must be close to zero for a predetermined time. Second, the voltage difference between the generator output and the grid 120 must be close to zero. Finally, all fault conditions should be cleared. Once the synchronizer 190 detects these conditions or receives a signal from another module indicating these three conditions, the synchronizer 190 will close the utility breakers 160 or signal the SCM 130 to close the utility breakers 160. After the breakers 160 are closed, the synchronizer 190 maintains a minimum specified load on the generator 90 and adjusts the generator excitation current to provide the load reactive power demand (VARs). The synchronizer 190 also opens the utility breakers 160 if power flows from the grid 120 to the generator 90 or other fault conditions develop.

In some constructions, synch check relays compare the grid and generator voltage, frequency and phase angle during synchronization. The synch check relays signal the SCM when synchronization is possible.

In another construction, an active synchronizer or the FCM 170 and AVR 115 perform the functions of the synchronizer 190. The LCM 80 or other device capable of controlling engine speed (e.g., speed-governor, FCM, etc.) maintains the desired speed while the generator is synchronized.

In constructions having active synchronization, the FCM in conjunction with the LCM maintain the desired generator speed. The grid frequency and phase angle are measured and compared to the generator output frequency and phase angle. The FCM and LCM vary the speed of the turbine and the generator to eliminate frequency and phase angle differences. Meanwhile, the AVR adjusts the generator excitation to achieve a voltage match between the grid and the generator. Once the frequency, phase angle, and voltage match for a sufficient period of time, the utility breakers are closed and the generator is loaded.

Other constructions use separate synchronizers or synchronizers combined with other control modules such as the SCM 130.

Black Start Control Module

The black start control module 165 (BSM) provides auxiliary power to the microturbine engine system 10 during a black start. A black start is required when the microturbine engine system 10 is not running and the grid 120 or any other external power sources are unavailable. Under these conditions, no external power is available to start the microturbine engine system 10.

The black start module 165, illustrated schematically in FIG. 7, controls a battery 175 or other energy storage device that is capable of providing a usable power supply during a black start. In a preferred construction, the BSM 165 is capable of providing a short burst of power (about 1 second) at 19 kVA and a sustained output of 8 kW for at least 160 seconds. These power requirements allow for one attempted start of the microturbine engine system 10. The preferred black start module 165 should be capable of providing power for three such start attempts without requiring a recharge. Other microturbine engine systems 10 may require more or less power and, as such, each system is preferably tailored to the specific engine and application.

In the construction of FIG. 7, the battery 175, a combined inverter/rectifier 195, a filter 196, and a transformer 197 are included within the BSM 165. Other systems may include an inverter and separate battery charger in place of the combined inverter/rectifier 195. The combined inverter/rectifier 195 is capable of receiving DC power from the battery 175 and delivering AC power to the filter 196, or is capable of receiving AC power from the filter 196 and delivering it to the battery 175 as a DC power supply. The filter 196 receives AC power from either the transformer 197 or the inverter/rectifier 195 and is operable to filter out undesirable transient signals at frequencies other than the desired frequency. The transformer 197 steps up the voltage from the inverter/rectifier 195 for delivery to the auxiliary systems or steps down the voltage for delivery to the inverter/rectifier 195 and ultimately to the battery 175. The system of FIG. 7 including the transformer 197, allows for the use of lower voltage batteries. For example, a system with a battery voltage below 300 volts is capable of powering the 480-volt auxiliary systems, with preferred systems using battery systems below 200 volts. Preferred systems use nickel-metal-hydride batteries, however other batteries can be used with the present system. In other constructions, the batteries may be contained within another module such as the block load module 140.

The black start switches 145 isolate the microturbine engine and the auxiliary systems (e.g., fuel supply system, lube oil system, etc.) from the load bus 125 and the utility grid 120. In many constructions, the switches 145 are located within the BSM 165 or at another convenient location.

During a black start, power is provided by the BSM 165 to the SCM 130. The SCM 130 detects the conditions that call for a black start, signals the BSM 165 that a black start is needed and configures the switches to isolate the microturbine engine and auxiliaries from the grid 120 and the load bus 125. The BSM 165 supplies power at the desired frequency and voltage to the auxiliary systems. The BSM 165 initiates the fuel pump 75 to supply fuel to the engine, the lube oil pump 95 to supply lubrication oil to the engine, and the high-pressure oil pump 105 to supply high-pressure oil to the starter wheel 100 and initiate rotation of the gasifier turbine 35 and compressor 45. In other constructions, an electric motor is used to initiate rotation of the gasifier turbine 35 and compressor 45 rather than the starter wheel 100. The gasifier turbine 35 and compressor 45 accelerate to a speed sufficient to sustain air flow and combustion within the combustor 55 and start the engine cycle. Once the engine is started, the black start module 165 power output is synchronized to the generator output and the generator 90 is loaded to a point that allows it to power the auxiliary systems. Once the generator 90 is powering the system, the BSM 165 disengages and returns control to the SCM 130. During normal generator operation, power flows from the generator 90 or the utility grid 120 into the BLM 165 to recharge the battery 175.

Block Load Module

Figure 6:
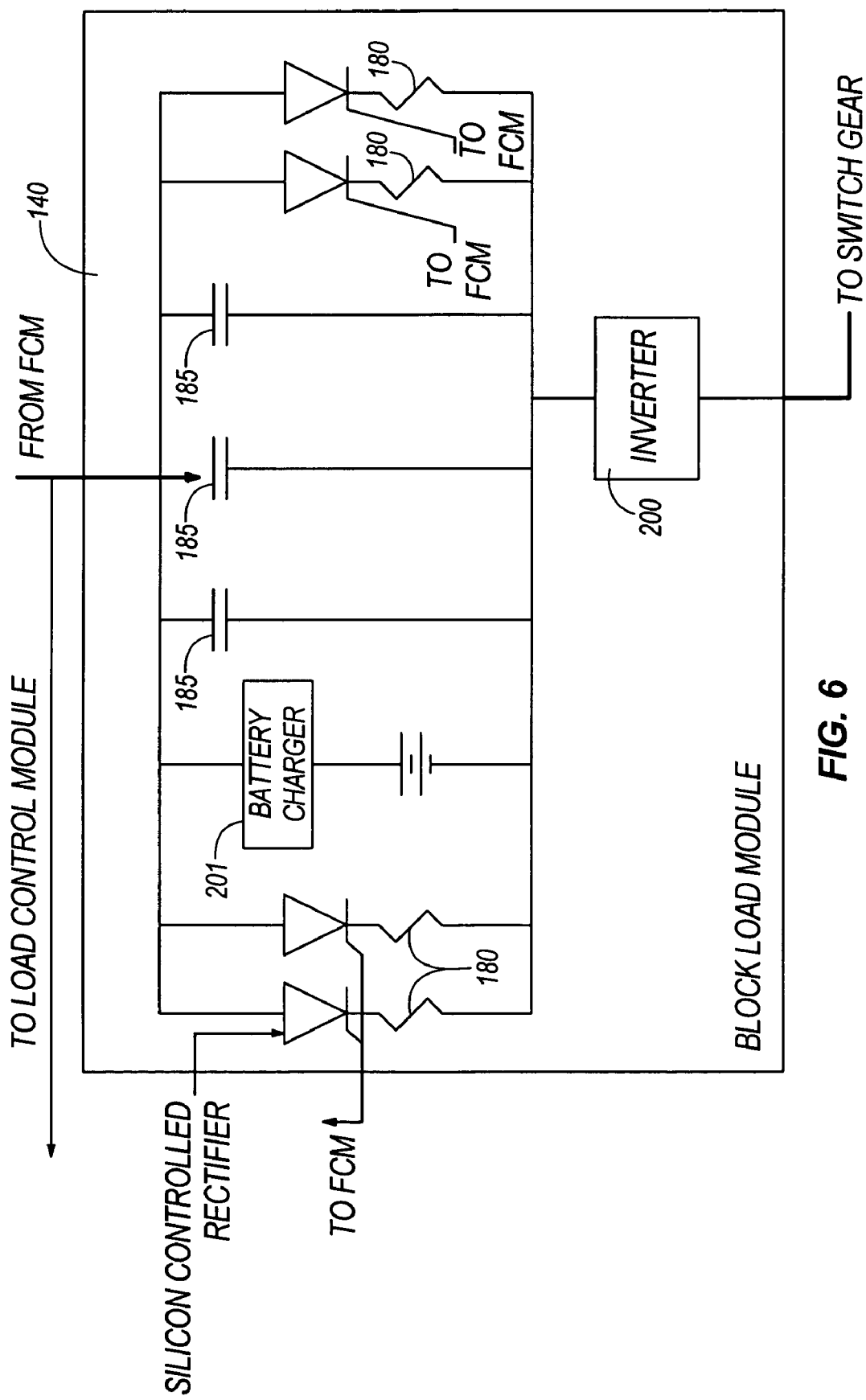
FIG. 6 is a schematic representation of the block load module of FIG. 2.

The block load module 140 in combination with the frequency control module 170 define an energy management system 199 as illustrated in FIG. 2. The block load module 140 illustrated schematically in FIG. 6 may include one or more of a bank of batteries 175a, an inverter 200, the resistive load 180, the capacitive load 185, and a battery charger 201. FIG. 6 illustrates only one possible configuration of a block load module 140. Other configurations may include variations in the connections (i.e., parallel or series), variations in the components, or variations in the arrangement of the components.

The battery charger 195 may be integrated into the inverter 200 or may be a separate component. Other energy storage devices such as superconductors, ultracaps, or flywheels can also be used to store excess energy. A preferred construction of the block load module 140 includes a bank of ultracaps 185 that are able to absorb and discharge great amounts of power quickly, thereby protecting the batteries 175 from sudden inflows or outflows of power. Some systems include batteries 175 that are charged by the generator 90 and discharge power to the system as needed. The battery charger 195 converts the AC power produced by the generator 90 or supplied by the grid 120 to DC power to charge the bank of batteries 175. When power is needed from the batteries 175 (e.g., for a black start or sudden increase in load) a DC current flows out of the batteries 175 to the inverter 200 where it is converted to usable AC power.

The block load module 140 connects to the generator 90 and is recharged during engine operation. The load control module 80 monitors the flow of power entering the block load module 140 and uses this value to control the generator output. The load control module 80 maintains an adequate flow of power to the block load module 140 to charge the batteries 175 if present.

During stand-alone operation, the block load module 140 is able to absorb sudden load changes by providing excess power (or reducing total generator load) for a load increase and by acting as a load bank for sudden load drops. For example, a base load on the generator 90 that is greater than the load on the load bus 125 can be maintained by allowing the block load module 140 to absorb a portion of the generator output. Ultracaps 185, batteries 175, other energy storage devices, or resistors 180 can absorb the excess power. If the load on the load bus 125 suddenly increases, the amount of power absorbed by the block load module 140 is immediately reduced, thereby allowing the generator 90 to easily pick-up the additional load bus load without actually increasing generator output. If, on the other hand, the load on the load bus 125 is suddenly reduced, the block load module 140 absorbs the additional power. In preferred constructions, the block load module 140 is able to absorb over 100% of the power output by the generator 90. The power capacity of the block load module 140 allows the module to absorb the generator power without substantial frequency variation even if a fully loaded load bus 125 is suddenly disconnected from the generator 90.

A simple block load module includes a bank of silicon controlled rectifiers 202 each connected in series with a resistor 185. The SCRs 202 are capable of quickly switching individual resistors "on" or "off" to control the size of the resistive load within the block load module.

Anti-Islanding Protection

During grid parallel operation, the generator 90 is electrically connected to the grid 120 and to the load bus 125. Under certain conditions, it is possible to have no power flowing into the system from the grid 120 or out of the system to the grid 120. Specifically, when the load applied to the load bus 125 very closely matches the generator output, no power will be transferred to/from the grid 120. Under these conditions, it is possible to lose the grid 120 without detecting the loss and without disconnecting from the grid 120. This situation, termed islanding is undesirable. When an island condition is detected, the SCM 130 disconnects the microturbine engine system 10 from the grid 120 by opening the utility breakers 160.

To detect an islanding condition, one construction of the microturbine engine system 10 uses the automatic voltage regulator 115. When synchronized to the utility grid 120, the AVR 115 loses its ability to control voltage and gains the ability to control reactive power and power factor as described above. To detect islanding, the SCM 130 periodically (e.g., every 10 seconds or less) sends a signal to the AVR 115 to vary the power factor. If, in response to the signal, the power factor changes, the engine is still connected to the grid and no islanding condition is present. If, on the other hand, the generator voltage changes in response to the attempt to vary the power factor, an islanding condition is present and the SCM 130 immediately disconnects the microturbine engine system 10 from the grid 120.

Figure 18:
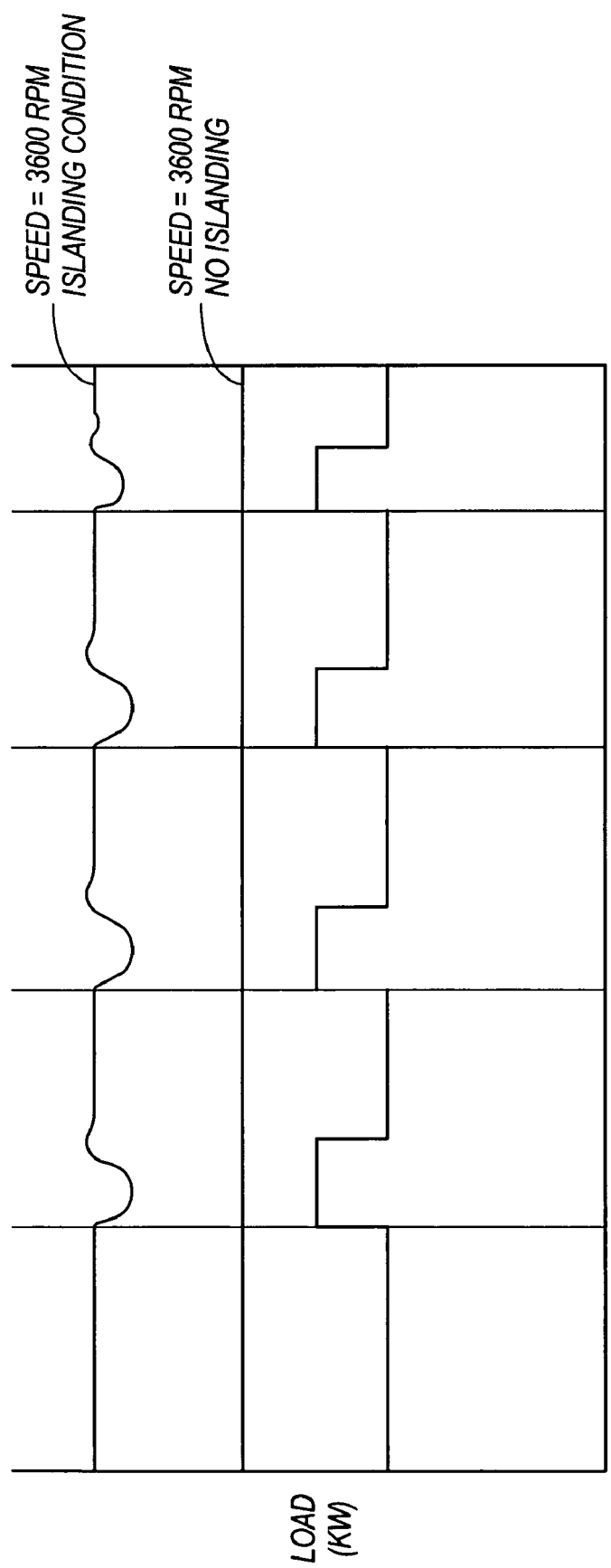
FIG. 18 is a graphical representation of power and speed versus time in one construction of an anti-islanding scheme.

In another construction, islanding is detected using the FCM 170 rather than the AVR 115. The FCM 170 periodically (e.g., every 10 seconds or less) pulses a small load (e.g., 2 kW) on for a short period of time at a fixed frequency as illustrated in FIG. 18. If the grid 120 is still present, the microturbine engine system 10 does not respond to the pulsing load, instead the grid 120 absorbs the load. If on the other hand, the grid 120 is not available, the microturbine engine speed and temperatures fluctuate with the load. The SCM 130 detects the speed or temperature fluctuation and determines that an islanding condition exists. The SCM 130 then immediately disconnects the generator 90 from the grid 120.

In yet another construction, the FCM detects islanding directly. A sudden but minute shift in frequency often occurs when the grid is lost. The FCM is sensitive enough to detect this change. The change enables the FCM and it begins to actively control frequency. When the SCM detects an enabled FCM and a closed utility breaker it determines that an islanding condition is present and opens the utility breaker.

Asynchronous Generator

An asynchronous generator operates at speeds that vary as a function of the load applied to the generator. Further, asynchronous generators do not need to be synchronized to the utility grid 120 thereby eliminating the need for a synchronizer. The FCM 170, black start module 165, block load module 140, load control module 80 and system control module 130 operate substantially as described above with asynchronous generators.

Several modules have been described herein as including controls or controlling other devices. Modules that perform some control functions include the system control module (SCM) 130, the load control module (LCM) 80, the frequency control module (FCM) 170, the generator synchronizer (if present), the black start module (BSM) 165, the automatic voltage regulator (AVR) 115, and the block load module (BLM) 140.

Many variations of controls are available and can be used in one or all of the above-described modules. Controls could be, but are not limited to, mechanical, electromechanical, analog electric, PLC based, or microprocessor based digital controls. For example, the load control module 80 could include a mechanical control system such as a flyball-type governor controlling the fuel valve 85. The SCM 130 on the other hand, can include a microprocessor based control that evaluates the different measured inputs (and outputs control setpoints to the other modules) using preprogrammed software. In another construction of the SCM 130, a plurality of switches are configured to provide the desired control signals based on inputs from the system and no microprocessor is used.

Figure 14:
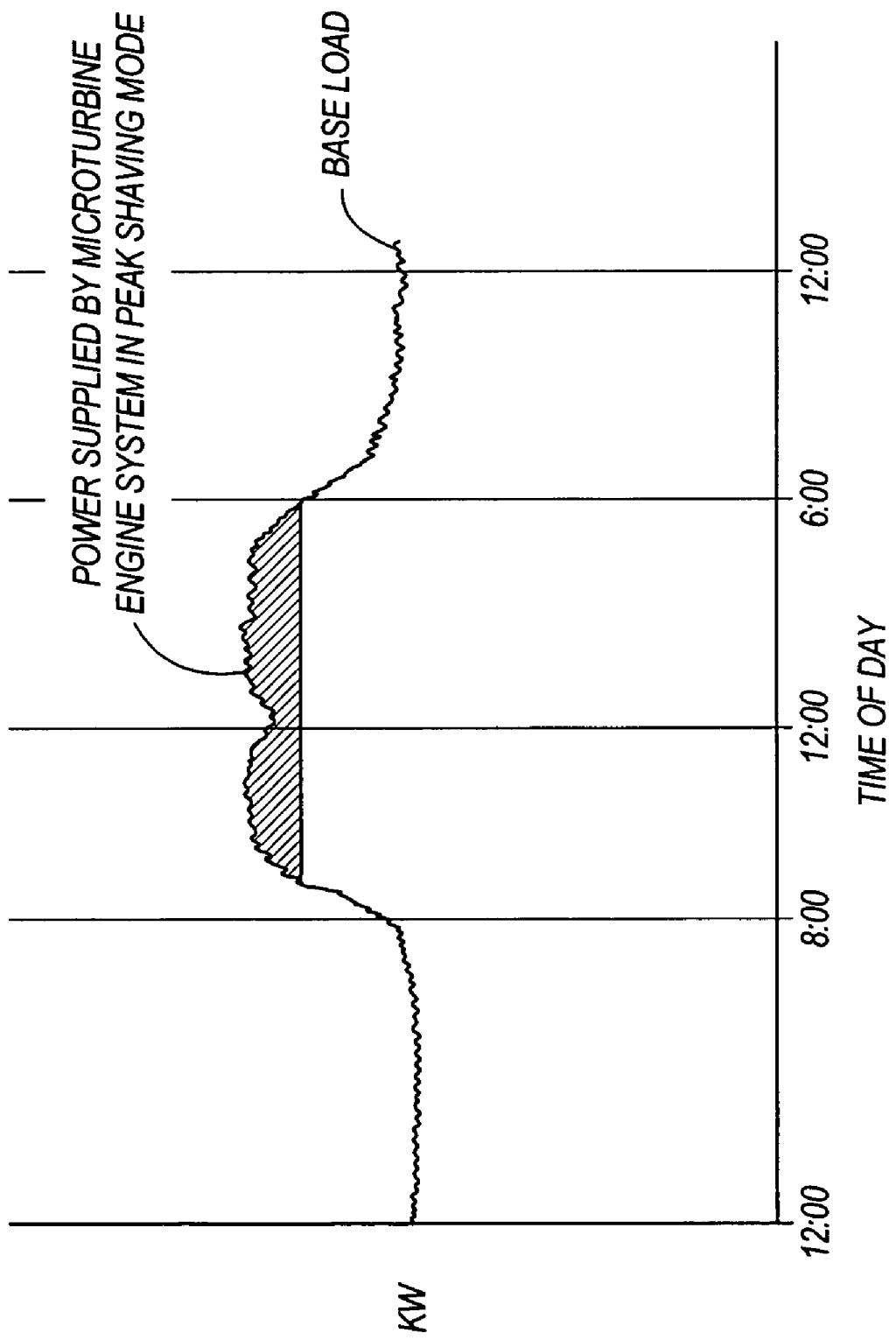
FIG. 14 is a graphical representation of the system operating in peak-shaving mode.
Figure 15:
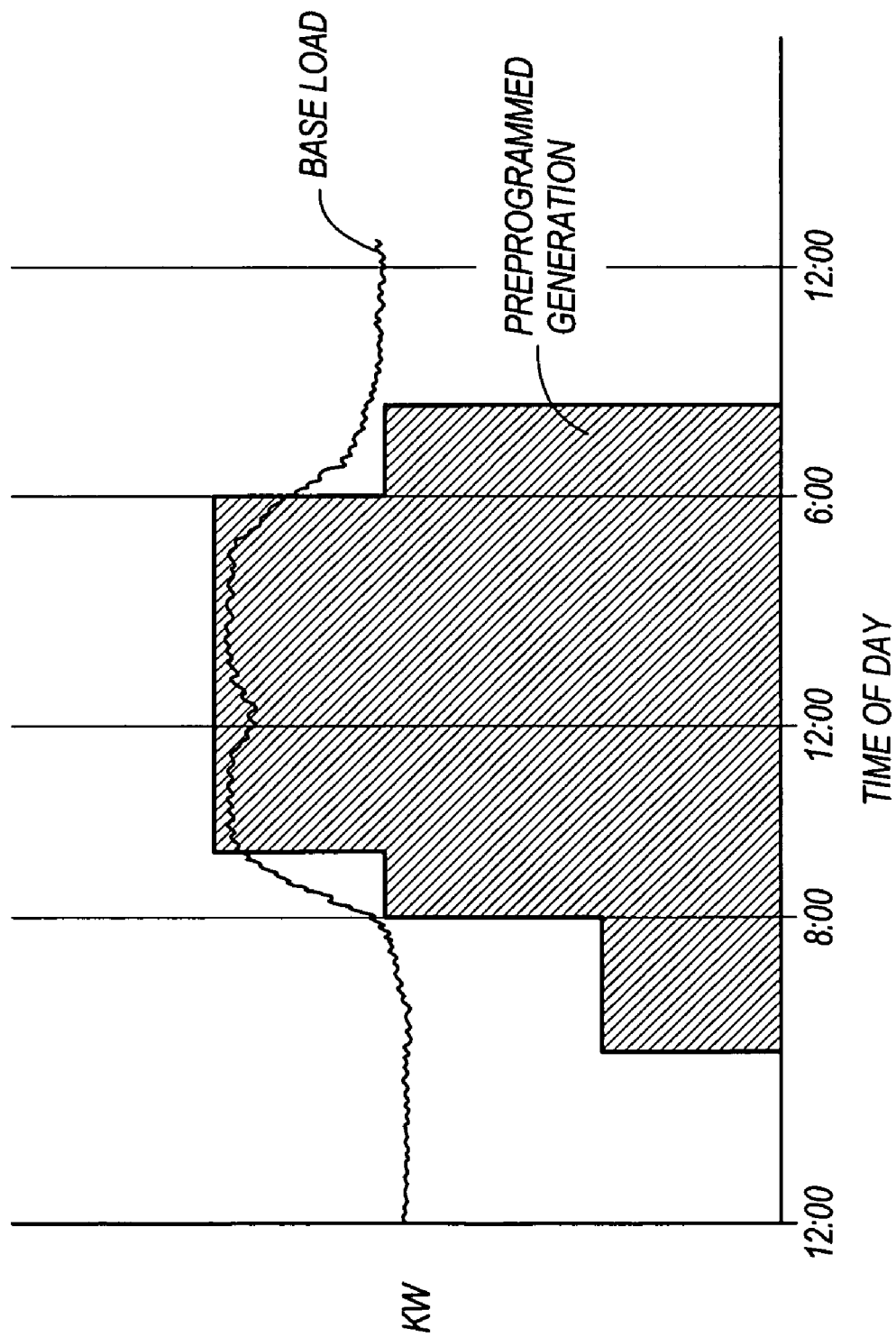
FIG. 15 is a graphical representation of the system operating in preprogrammed generation mode.

FIGS. 14–17 graphically illustrate the quantity of power produced by the microturbine engine system 10 in its various modes of operation for one possible day. One possible base load for the day is illustrated on each graph with the cross hatched areas representing the power produced by the microturbine engine system 10. FIG. 14 represents the system in peak-shaving mode. In this mode, the entire base load is supplied by the grid 120 unless it exceeds a preset value. At this value, the system starts-up, synchronizes to the grid 120 and provides all of the power in excess of the preselected value.

FIG. 15 illustrates a system operating in preprogrammed mode. In this mode, the output power of the system is based not on the actual load but on the time of day. When the generated power falls below the base load, the grid 120 must supply the additional power. If the system generates power above the base load, the excess power is supplied to the grid 120 and purchased by the local utility.

Figure 16:
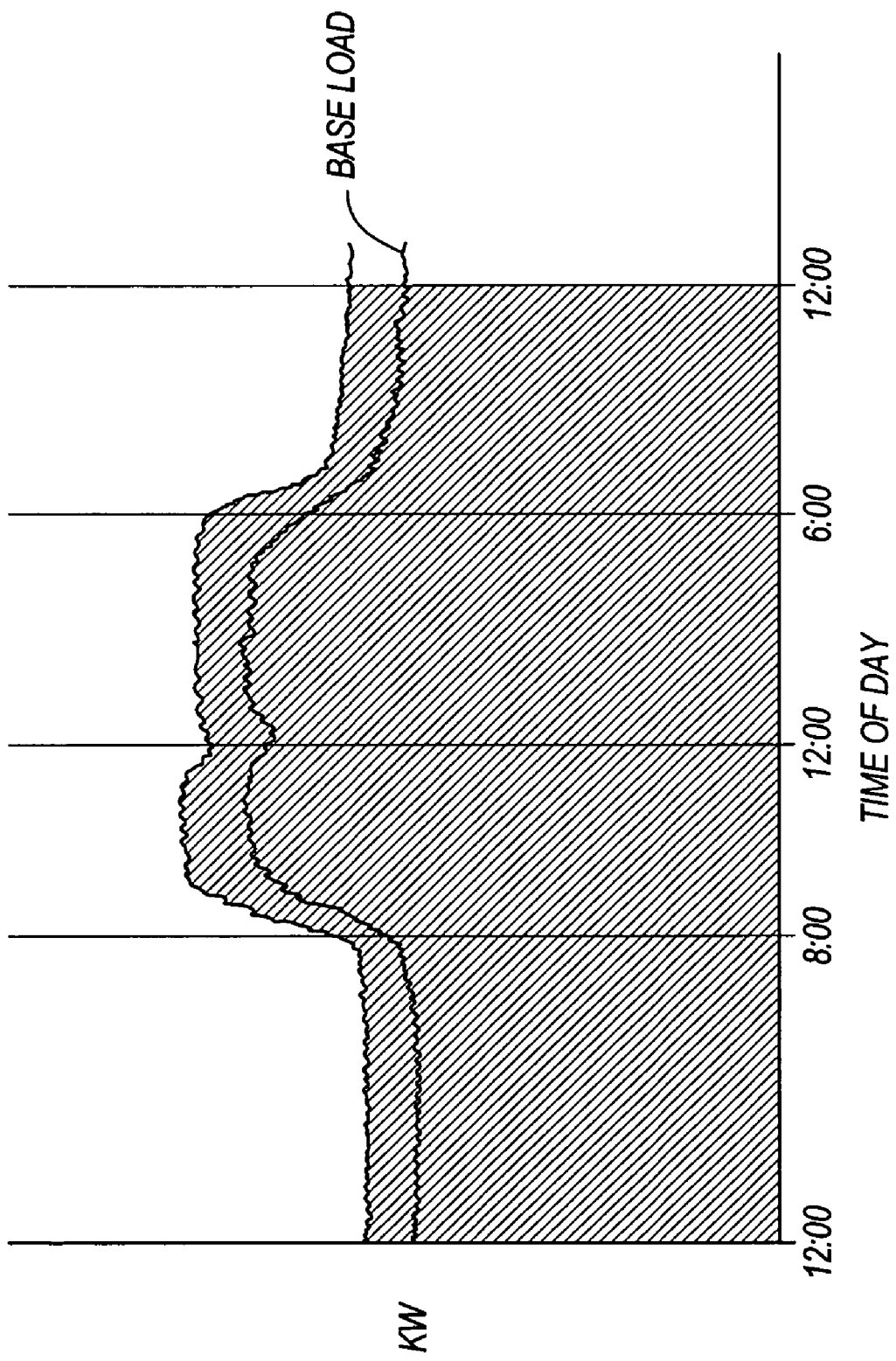
FIG. 16 is a graphical representation of the system operating in stand-alone mode with a base load in excess of the minimum generator load.

FIG. 16 illustrates the system operating in stand-alone mode. In this mode, the microturbine engine system 10 provides the base load plus a small load to the block load module 140. The excess load provided to the block load module 140 maintains the charge condition of the batteries 175, if employed, and allows the FCM 170 to control generator speed in response to sudden load changes.

Figure 17:
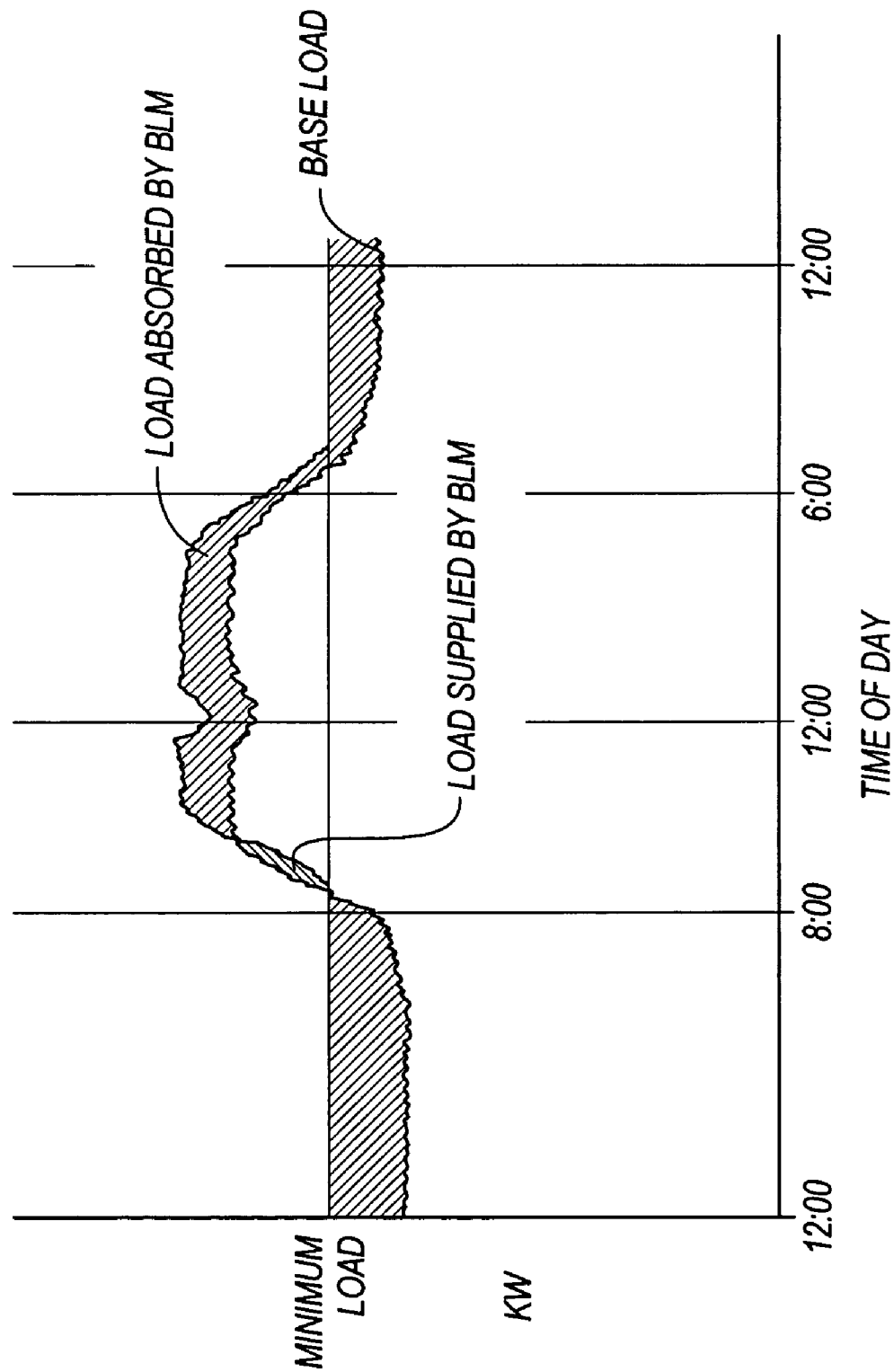
FIG. 17 is a graphical representation of the system operating in stand-alone mode with portions of the base load below the minimum generator load.

FIG. 17 is similar to FIG. 16 with the base load being below the minimum system load. Under these conditions, the block load module 140 maintains a minimum load on the generator 90.

In all of the various operating modes of the microturbine engine system 10, the FCM 170 and BLM 140 can be used to absorb a portion of the generator output. The use of the FCM 170 and BLM 140 in this manner provides for smoother transitions between modes and/or smoother load changes due to the high-speed response of the electrical load in the BLM 140 when compared to the response of the mechanical system.

It should be noted that the schematic representations of FIGS. 2–6 use different line weights for different connections. Heavy line weights indicate power flows, such as the flow out of the generator. Medium weight lines indicate other flows such as fuel or lube oil. Light weight lines generally indicate control or sensor signals. However, light weight or medium weight lines are also used to indicate power flows within a module. For example, FIG. 5 illustrates power flowing into and out of the switch gear in heavy lines but shows the flow within the switch gear as medium weight lines.

Although the invention has been described in detail with reference to certain preferred constructions, variations and modifications exist within the scope and spirit of the invention as described and defined in the following claims.

What is claimed is:

1. A microturbine engine system operable to provide electrical power to a load, the microturbine engine system comprising:
    a compressor operable to produce a flow of compressed air;
    a fuel delivery system operable to deliver a flow of fuel;
    a recuperator in fluid communication with the compressor to receive the flow of compressed air, the flow of compressed air being preheated within the recuperator to produce a flow of preheated compressed air;
    a combustor receiving the flow of preheated compressed air and the flow of fuel, the combustor combusting the flow of compressed air and the flow of fuel to produce a flow of products of combustion;
    a turbine driven by the flow of products of combustion from the combustor;
    a synchronous generator coupled to the turbine, the synchronous generator driven by the turbine at a speed, the synchronous generator outputting an electrical power having a frequency;
    an energy management system including a variable electric load, the variable electric load absorbing at least a portion of the electrical power, the remainder of the electrical power being delivered to the load; and
    a control system operable to vary the flow of fuel and the variable electric load to maintain the portion of the electrical power absorbed by the variable electric load and the frequency of the electrical power within predetermined ranges.

2. The microturbine engine system of claim 1, wherein the variable electrical load includes a plurality of resistors and a plurality of switches, wherein the switches are individually actuatable to apply or remove electrical load.

3. The microturbine engine system of claim 2, wherein the switches include silicon-controlled rectifiers.

4. The microturbine engine system of claim 1, wherein the variable electrical load of the energy management system includes an energy storage device.

5. The microturbine engine system of claim 1 wherein the variable electrical load of the energy management system includes a plurality of energy storage devices each device being one of an ultracapacitor, a resistor, and a battery charger.

6. The microturbine engine system of claim 1, wherein the electrical power is distributed to the load and to the variable electric load, and wherein the energy management system varies the variable electrical load to maintain the electrical power output by the generator, and wherein the control system varies the flow of fuel to maintain the variable electrical load when operating in grid parallel mode.

* * * * *